United States Patent
Kumar et al.

(10) Patent No.: US 11,888,404 B2
(45) Date of Patent: *Jan. 30, 2024

(54) MULTIPLE-PORT BIDIRECTIONAL CONVERTER AND CONTROL METHOD THEREOF

(71) Applicant: Delta Electronics, Inc., Taipei (TW)

(72) Inventors: Misha Kumar, Cary, NC (US); Yungtaek Jang, Cary, NC (US); Peter Barbosa, Cary, NC (US); Minli Jia, Shanghai (CN); Hao Sun, Shanghai (CN)

(73) Assignee: Delta Electronics, Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,382

(22) Filed: Jan. 3, 2023

(65) Prior Publication Data

US 2023/0136629 A1    May 4, 2023

Related U.S. Application Data

(63) Continuation of application No. 17/124,175, filed on Dec. 16, 2020, now Pat. No. 11,594,973.

(Continued)

(51) Int. Cl.
*H02M 3/335* (2006.01)
*H02M 3/00* (2006.01)
(Continued)

(52) U.S. Cl.
CPC ......... *H02M 3/33573* (2021.05); *H02J 7/007* (2013.01); *H02J 50/12* (2016.02);
(Continued)

(58) Field of Classification Search
CPC ................ H02M 3/33575; H02M 3/33584
See application file for complete search history.

(56) References Cited

U.S. PATENT DOCUMENTS

| | | |
|---|---|---|
| 5,404,092 A | 4/1995 | Gegner |
| 6,934,167 B2 | 8/2005 | Jang et al. |

(Continued)

FOREIGN PATENT DOCUMENTS

| | | |
|---|---|---|
| CN | 103262403 A | 8/2013 |
| CN | 102290999 B | 12/2013 |

(Continued)

OTHER PUBLICATIONS

Gang Liu "Implementation of a 3.3-kW DC-DC Converter for EV On-Board Charger Employing the Series-Resonant Converter With Reduced-Frequency-Range Control". (Year: 2016).*

(Continued)

*Primary Examiner* — Sisay G Tiku
(74) *Attorney, Agent, or Firm* — KIRTON McCONKIE; Evan R. Witt

(57) ABSTRACT

A bidirectional DC-DC converter with three or more ports is described along with a method of operation thereof. The converter utilizes a common transformer for all ports and allows for power transfer from any port to any or all of the remaining ports. The converter may utilize a controller which implements variable-frequency control, delay-time (Continued)

control, and/or phase-delay control to achieve power transfer as desired between the converter ports. In some cases, power transfer between ports can operate similar to a series-resonant converter or a dual active bridge converter.

20 Claims, 11 Drawing Sheets

Related U.S. Application Data

(60) Provisional application No. 63/060,761, filed on Aug. 4, 2020.

(51) Int. Cl.
| | | |
|---|---|---|
| *H02J 7/00* | (2006.01) | |
| *H02M 7/5387* | (2007.01) | |
| *H02J 50/12* | (2016.01) | |
| *H02M 1/00* | (2006.01) | |

(52) U.S. Cl.
CPC ....... *H02M 3/015* (2021.05); *H02M 3/33584* (2013.01); *H02M 3/33592* (2013.01); *H02M 7/5387* (2013.01); *H02M 1/008* (2021.05); *H02M 1/0058* (2021.05)

(56) References Cited

U.S. PATENT DOCUMENTS

| | | | |
|---|---|---|---|
| 8,587,975 | B2 | 11/2013 | Jain et al. |
| 9,490,704 | B2 | 11/2016 | Jang et al. |
| 10,044,279 | B2 | 8/2018 | Guepratte et al. |
| 10,868,422 | B1 * | 12/2020 | Jia ............................ H02S 50/00 |
| 11,491,883 | B2 * | 11/2022 | Khaligh ................ H02M 7/797 |
| 2008/0198632 | A1 | 8/2008 | Takayanagi |
| 2014/0103860 | A1 | 4/2014 | Kominami et al. |
| 2016/0020702 | A1 | 1/2016 | Trescases et al. |
| 2017/0005584 | A1 * | 1/2017 | Guepratte ......... H02M 3/33523 |
| 2017/0104365 | A1 | 4/2017 | Ghosh et al. |
| 2018/0222333 | A1 * | 8/2018 | Khaligh ............ H02M 3/33584 |
| 2020/0212816 | A1 | 7/2020 | Sun et al. |
| 2020/0412237 | A1 | 12/2020 | Dai et al. |

FOREIGN PATENT DOCUMENTS

| | | | | |
|---|---|---|---|---|
| CN | 206452300 | U | 8/2017 | |
| CN | 107284273 | A | 10/2017 | |
| CN | 206775390 | U * | 12/2017 | |
| CN | 109167423 | A | 1/2019 | |
| CN | 109256955 | A * | 1/2019 | ........ H02M 3/33584 |
| CN | 109703399 | A | 5/2019 | |
| CN | 110556901 | A | 12/2019 | |
| CN | 110649813 | A | 1/2020 | |
| CN | 110719035 | A | 1/2020 | |
| CN | 111355398 | A | 6/2020 | |
| CN | 111355398 | A * | 6/2020 | .............. B60L 53/20 |
| CN | 111464040 | A | 7/2020 | |
| CN | 110649813 | B * | 11/2020 | |
| CN | 112803540 | A * | 5/2021 | ............... F28D 7/06 |
| JP | 2015154506 | A | 8/2015 | |
| JP | 2019106839 | A | 6/2019 | |
| JP | 2019161724 | A | 9/2019 | |
| JP | 2020028216 | A | 2/2020 | |
| KR | 20160040378 | A | 4/2016 | |
| WO | WO-2019199964 | A1 * | 10/2019 | .............. B60L 53/14 |
| WO | 2020096655 | A1 | 5/2020 | |
| WO | WO-2021247278 | A1 * | 12/2021 | |

OTHER PUBLICATIONS

Hariharan "Three-Port Series-Resonant DC-DC Converter to Interface Renewable Energy Sources" (Year: 2009).*
H. Tao, A. Kotsopoulos, J. L. Duarte and M. A. M. Hendrix, "Transformer-Coupled Multiport ZVS Bidirectional DC-DC Converter With Wide Input Range," in IEEE Transactions on Power Electronics, vol. 23, No. 2, pp. 771-781, Mar. 2008, doi: 10.1109/TPEL.2007.915129.
G. Liu, Y. Jang, M. M. Jovanovic and J. Q. Zhang, "Implementation of a 3.3-kW DC-DC Converter for EV On-Board Charger Employing the Series-Resonant Converter With Reduced-Frequency-Range Control," in IEEE Transactions on Power Electronics, vol. 32, No. 6, pp. 4168-4184, Jun. 2017, doi: 10.1109/TPEL.2016.2598173.
Y. Jang, M. M. Jovanović, M. Kumar, J. M. Ruiz, R. Lu and T. Wei, "Isolated, Bi-Directional DC-DC Converter for Fuel Cell Electric Vehicle Applications," 2019 IEEE Applied Power Electronics Conference and Exposition (APEC), Anaheim, CA, USA, 2019, pp. 1674-1681, doi: 10.1109/APEC.2019.8722067.
G. G. Oggier, R. Leidhold, G. O. Garcia, A. R. Oliva, J. C. Balda and F. Barlow, "Extending the ZVS operating range of dual active bridge high-power DC-DC converters," 2006 37th IEEE Power Electronics Specialists Conference, Jeju, 2006, pp. 1-7, doi: 10.1109/pesc.2006.1712142.
Milan M. Jovanović (1994) Invited paper. Resonant, quasi-resonant, multi-resonant and soft-switching techniques—merits and limitations, International Journal of Electronics, 77:5, 537-554, DOI: 10.1080/00207219408926086.
M. N. Kheraluwala, R. W. Gascoigne, D. M. Divan and E. D. Baumann, "Performance characterization of a high-power dual active bridge DC-to-DC converter," in IEEE Transactions on Industry Applications, vol. 28, No. 6, pp. 1294-1301, Nov.-Dec. 1992, doi: 10.1109/28.175280.
Krishnaswami H et al: "Three-Port Series-Resonant DC-DC Converter to Interface Renewable Energy Sources With Bidirectional Load and Energy Storage Ports", IEEE Transactions on Power Electronics, Institute of Electrical and Electronics Engineers, USA, vol. 12, No. 10, Oct. 1, 2009 (Oct. 1, 2009), pp. 2289-2297, XP011271821, ISSN: 0885-8993.
Heller M J et al: "Modulation Scheme Optimization for a Dual Three-Phase Active Bridge (D3AB) PFC Rectifier Topology", 2019 20th Workshop on Control and Modeling for Power Electronics (COMPEL), IEEE, Jun. 17, 2019 (Jun. 17, 2019), pp. 1-8, XP033581221, DOI: 10.1109/COMPEL.2019.8769627.
Sankala Arto et al: "Modular Double-Cascade converter with soft switching DC/DC isolation converter", 2013 15th European Conference on Power Electronics and Applications (EPE), IEEE, Sep. 2, 2013 (Sep. 2, 2013), pp. 1-9, XP032505641, DOI: 10.1109/EPE.2013.6631838.
C. Zhao et al: "An Isolated Three-Port Bidirectional DC-DC Converter With Decoupled Power Flow Management", IEEE Transactions on Power Electronics, Institute of Electrical and Electronics Engineers, USA, vol. 23, No. 5, Sep. 1, 2008 (Sep. 1, 2008).
A. K. Bhattacharjee et al: "Review of Multiport Converters for Solar and Energy Storage Integration", IEEE Transactions on Power Electronics, Institute of Electrical and Electronics Engineers, USA, vol. 34, No. 2, Feb. 1, 2019 (Feb. 1, 2019).
Office action dated Sep. 27, 2022, in related U.S. Appl. No. 17/368,856, filed Jul. 7, 2021.
Vishal Verma et al. "Performance enhancement of the Dual Active Bridge with dual phase shift control and variable frequency modulation", IEEE, 2016.

* cited by examiner

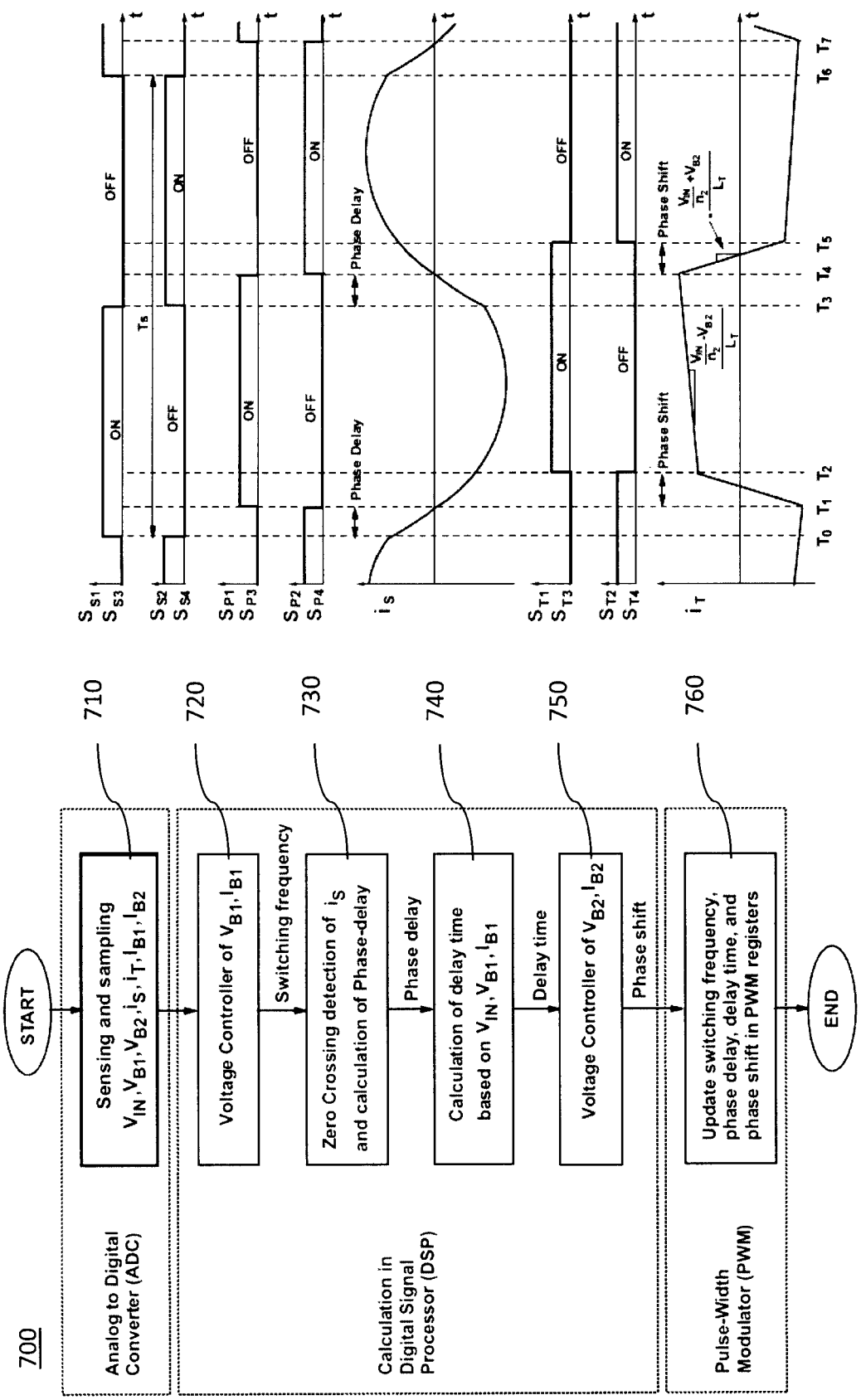

MULTIPLE-PORT BIDIRECTIONAL CONVERTER AND CONTROL METHOD THEREOF

RELATED APPLICATION

This application is a continuation of U.S. Nonprovisional application Ser. No. 17/124,175 filed Dec. 16, 2020, which claims the benefit of priority to U.S. Provisional Application No. 63/060,761, filed Aug. 4, 2020, the entire contents of both of which are incorporated herein by reference for all purposes.

TECHNICAL FIELD

The present disclosure relates to a multiple-port bidirectional DC-DC converter and a control method thereof. More particularly, the present disclosure relates to an integrated one or more bidirectional resonant converters and one or more dual active bridge (DAB) converters with bidirectional control.

BACKGROUND

High-availability power systems for equipment used in mission-critical applications must be implemented with enhanced reliability. Usually, increased power-system reliability is achieved by employing power system components with high intrinsic reliability and by implementing highly redundant power-system architectures that include the redundancy of energy sources. The energy source generally consists of an ac utility line, stacks of batteries with or without downstream loads, or super capacitors. The availability of redundant power systems with multiple energy sources can be maximized by providing multiple power paths. In applications with more than one energy source, all energy sources are charged by a single source while each energy source is coupled to its individual load to deliver uninterrupted power. However, to increase reliability, one of the energy sources should be able to deliver energy to the other energy sources and vice versa. As a result, the high-availability system requires multiple bidirectional converters to charge and discharge between energy sources. There are known bidirectional converters with series resonant converter topologies and dual active bridge (DAB) converter topologies.

Generally, resonant converters employ a resonant-tank circuit to shape the switch voltage and/or current waveforms to minimize switching losses and allow high-frequency operation without deterioration of conversion efficiency. Moreover, because resonant converters absorb parasitic components such as leakage and/or magnetizing inductance of transformers into their resonant-tank circuit, they are inevitably used in applications where these parasitic components are pronounced, such as high-voltage and/or high-current isolated power supplies for battery charging systems.

FIGS. 1A and 1B respectively illustrate a typical isolated resonant converter topology and its ideal operating waveforms. As shown in FIG. 1A, in this topology, the resonant components are inductor $L_R$ and capacitor $C_R$. Because resonant inductor $L_R$ is connected in series with resonant capacitors $C_R$, the circuit in FIG. 1A is referred to as a series-resonant converter (SRC). It should be noted that to maximize conversion efficiency, the secondary-side rectifiers are usually implemented by synchronous rectifiers.

FIG. 1B illustrates typical timing diagrams of switch-control signals for the series-resonant converter (SRC) of FIG. 1A, operating with zero voltage switching (ZVS). Referring to both FIGS. 1A and 1B, all switches $S_{P1}$, $S_{P2}$, $S_{P3}$, $S_{P4}$, $S_{S1}$, $S_{S2}$, $S_{S3}$, and $S_{S4}$ operate with the same duty ratio of 50% and the primary stage switches in the same leg (namely, $S_{P1}$, $S_{P2}$, and $S_{P3}$, $S_{P4}$) operate in a complementary fashion to avoid cross-conduction. The frequency of primary switches is determined by a feedback control loop that is employed to regulate the output ("variable-frequency control"). The phase delay control operation of the secondary-side synchronous rectifier switches is realized by synchronizing their switching with zero crossing of a resonant current, $i_P$. That is, a phase delay (e.g., $T_0$ to $T_1$) with respect to the waveforms for the primary stage switches ($S_{P1}$, $S_{P2}$, $S_{P3}$, and $S_{P4}$) is introduced to the waveforms for the secondary stage switches ($S_{S1}$, $S_{S2}$, $S_{S3}$, and $S_{S4}$).

Specifically, as shown in FIG. 1B, switching of secondary-side synchronous rectifier switches $S_{S1}$ and $S_{S3}$ is synchronized with the positive period of resonant current, $i_P$, whereas switching of secondary-side synchronous rectifier switches $S_{S2}$ and $S_{S4}$ is synchronized with the negative period of the resonant current, $i_P$. To achieve ZVS in practical implementations, the duty ratios of primary switches are set to a value slightly less than 50% by introducing a short delay (or dead time) between the turn-off and turn-on of the complementarily operated same-leg switches. During this dead time, the current is commutated from the switch of the device that is turned off to the antiparallel diode of the other device which creates a condition for its subsequent ZVS turn on. The secondary-side synchronous rectifier switches are also operated with duty ratios slightly less than 50%. Although the series resonant converter with variable-frequency control as shown in FIG. 1A has a symmetric structure between the input and output ports, it is not suitable for bidirectional operation since it operates only as a step-down converter (i.e., $V_{IN} > (N_1/N_2) \cdot V_o$).

For example, U.S. Pat. No. 9,490,704 to Jang and Jovanović issued Nov. 8, 2016, incorporated herein by reference for all purposes, describes a system and a method for controlling secondary-side switches in resonant converters. Specifically, the control method disclosed therein improves the performance of series-resonant converters (SRC) operating with a wide input-voltage and/or output-voltage range by substantially reducing their switching-frequency range. Moreover, that implementation also makes the converter bidirectional, because the controllable switches on both sides of the transformer allow power to flow in both directions, and the proposed "delay time control" makes the series resonant converter capable of boosting the output voltage (i.e., $(N_1/N_2) \cdot V_o \geq V_{IN}$). The switching-frequency-range reduction as well as the voltage step up/down operation are achieved by controlling the output with a combination of variable-frequency control and delay time control. The variable-frequency control is used to control primary switches, whereas the delay time control is employed to control the secondary-side rectifier switches.

FIGS. 2A and 2B, respectively illustrates another typical isolated resonant converter topology and its ideal operating waveforms. As shown in FIG. 2A, in this topology, the resonant components are inductor $L_R$ and capacitor $C_R$. As shown in FIG. 2B, primary switches $S_{P1}$, $S_{P2}$, $S_{P3}$, and $S_{P4}$ operate with the same switching frequency and have identical duty cycles of approximately 50%. To achieve zero-voltage-switching of the complementarily operated primary switches of the same leg, a small dead time is provided between the turn-on and turn-off instants of these complementary-operated switches. Secondary switches $S_{S1}$, $S_{S2}$, $S_{S3}$, and $S_{S4}$ operate with the same switching frequency as the primary switches. However, secondary switches $S_{S2}$ and $S_{S3}$ operate with extended duty cycles that provide the delay time as shown in FIG. 2B. Secondary winding of transformer, TR, is shorted by secondary switches $S_{S2}$ and $S_{S3}$ during the delay time (for example, $T_1$ to $T_2$ and $T_4$ to $T_5$). The primary function of the delay time control is to make the series resonant converter be able to boost the output voltage so that it can reduce the switching frequency range of the converter. Moreover, the voltage step up/down operation achieved by controlling the output with a combination of the variable-frequency control and the delay time control makes the converter suitable for applications that require the bidirectional power flow.

FIGS. 3A and 3B respectively illustrate a circuit diagram of a DAB converter and its ideal operating waveforms. It is well-known in the art that a DAB converter has a bidirectional converter topology. As shown in FIG. 3A, in this topology, series inductor, $L_S$, is located between the primary-side active bridge that includes primary switches $S_{P1}$, $S_{P2}$, $S_{P3}$, and $S_{P4}$ and the secondary-side active bridge that includes secondary switches $S_{S1}$, $S_{S2}$, $S_{S3}$, and $S_{S4}$. Typically, primary switches $S_{P1}$, $S_{P2}$, $S_{P3}$, and $S_{P4}$ are operated with constant switching frequency. This switching frequency is matched by the secondary switches $S_{S1}$, $S_{S2}$, $S_{S3}$, and $S_{S4}$. Additionally, phase shift control is used to determine the amount of phase shift between the primary and secondary switching. As shown in FIG. 3B, all switches $S_{P1}$, $S_{P2}$, $S_{P3}$, $S_{P4}$, $S_{S1}$, $S_{S2}$, $S_{S3}$, and $S_{S4}$ operate with the same switching frequency and have identical duty cycles of slightly less than 50%. It should be noted that the turn-on and turn-off moments of secondary switches $S_{S1}$, $S_{S2}$, $S_{S3}$, and $S_{S4}$ are actively shifted (for example, from $T_0$ to $T_1$ and from $T_2$ to $T_3$) from the turn-on and turn-off moments of primary switches $S_{P1}$, $S_{P2}$, $S_{P3}$, and $S_{P4}$ as shown in FIG. 3B. By actively shifting the gate signals of the secondary switches, the induced current, $i_P$, across the inductor, $L_S$, is controlled. The DAB converter also works as a bidirectional converter because the controllable switches on both sides of the transformer allow power to flow in both directions, and the phase-shift control makes the converter operate in voltage step-up as well as step-down mode.

The following references, incorporated herein by reference, provide some additional background in the technical field:

[1] G. Liu, Y. Jang, M. M. Jovanović and J. Q. Zhang, "Implementation of a 3.3-kW DC-DC Converter for EV On-Board Charger Employing the Series-Resonant Converter With Reduced-Frequency-Range Control," in IEEE Transactions on Power Electronics, vol. 32, no. 6, pp. 4168-4184, June 2017, doi: 10.1109/TPEL.2016.2598173.

[2] Y. Jang, M. M. Jovanović, M. Kumar, J. M. Ruiz, R. Lu and T. Wei, "Isolated, Bidirectional DC-DC Converter for Fuel Cell Electric Vehicle Applications," 2019 IEEE Applied Power Electronics Conference and Exposition (APEC), Anaheim, CA, USA, 2019, pp. 1674-1681, doi: 10.1109/APEC.2019.8722067.

[3] G. G. Oggier, R. Leidhold, G. O. Garcia, A. R. Oliva, J. C. Balda and F. Barlow, "Extending the ZVS operating range of dual active bridge high-power DC-DC converters," 2006 37th IEEE Power Electronics Specialists Conference, Jeju, 2006, pp. 1-7, doi: 10.1109/pesc.2006.1712142.

[4] M. M. Jovanović (1994) Invited paper. "Resonant, quasi-resonant, multi-resonant and soft-switching techniques-merits and limitations," International Journal of Electronics, 77:5, 537-554, DOI: 10.1080/00207219408926086

[5] M. N. Kheraluwala, R. W. Gascoigne, D. M. Divan and E. D. Baumann, "Performance characterization of a high-power dual active bridge DC-to-DC converter," in IEEE Transactions on Industry Applications, vol. 28, no. 6, pp. 1294-1301, November-December 1992, doi: 10.1109/28.175280.

[6] A. K. Jain, R. Ayyanar, (Nov. 19, 2013). U.S. Pat. No. 8,587,975.

SUMMARY

In the present disclosure, various embodiments of a multiple-port bidirectional DC-DC converter and a control method therefor are disclosed, in which a single multiple-port bidirectional DC-DC converter can replace numerous unidirectional or bidirectional converters so that the total number of components is significantly reduced, and the utilization of components is improved.

In one aspect, the present disclosure provides a multiple-port converter, comprising: a transformer having a primary winding, a secondary winding and a tertiary winding; a primary power stage having a first plurality of switches and electrically connected to a first energy source and the primary winding of the transformer; a secondary power stage having a second plurality of switches and electrically connected to a second energy source and the secondary winding of the transformer, the primary power stage and secondary power stage forming a series resonant converter; a tertiary power stage having a third plurality of switches and electrically connected to a third energy source and the tertiary winding of the transformer, the primary power stage and tertiary power stage forming a dual active bridge converter; and a controller electrically connected to the primary, secondary, and tertiary power stages to measure operating conditions in the multiple-port converter and to provide control signals to the first, second and third plurality of switches.

In one embodiment, the controller comprises control logic configured to send the control signals to the first and second plurality of switches to transfer energy between the first energy source and the second energy source using phase delay control.

In one embodiment, the controller comprises control logic configured to send the control signals to the first and second plurality of switches to transfer energy between the first energy source and the second energy source using both phase delay control and delay time control.

In one embodiment, the controller comprises control logic configured to send the control signals to the first, second, and third plurality of switches to transfer energy from first energy source to the second energy source using phase delay control and to transfer energy from the first energy source to the third energy source using phase shift control.

In one embodiment, the control logic of the controller is configured to vary a switching frequency of the control signals to modulate an amount of energy transferred to the secondary stage, and wherein the phase shift control modulates an amount of energy transferred to the tertiary stage.

In one embodiment, the switching frequency is the same for the primary, secondary, and tertiary stages.

In one embodiment, the controller has control logic configured to send first and second control signals to the first plurality of switches and to send third and fourth control signals to the second plurality of switches, the third control signals are substantially identical to the first control signal with a phase delay, and the fourth control signals are substantially identical to the second control signal with the phase delay.

In one embodiment, the secondary power stage has a first capacitor and first inductor in series with the secondary winding of the transformer.

In one embodiment, the tertiary power stage has a second inductor in series with the tertiary winding of the transformer.

In one embodiment, the primary stage has a second capacitor in series with the primary winding of the transformer, the tertiary stage has a third capacitor in series with the tertiary winding of the transformer.

In one embodiment, the controller comprises control logic configured to send the control signals to the first, second, and third plurality of switches to transfer energy from the second energy source to the first energy source using phase delay control and delay time control, and from the first energy source to the third energy source using phase shift control.

In one embodiment, the tertiary power stage is a first tertiary power stage among a plurality of tertiary power stages, each of the plurality of tertiary power stages connected to a respective winding of the transformer and to a respective energy source, each tertiary power stage forming a respective dual active bridge converter with the primary power stage.

In another aspect, the present disclosure provides a method of controlling a DC-DC converter having a plurality of stages including first, second and third stages, the method comprising acts of; measuring a plurality of electrical properties of the DC-DC converter; determining a switching frequency, phase delay, and phase shift based at least in part on the measured plurality of electrical properties; switching a first plurality of switches of the first stage at the switching frequency; switching at least two of a second plurality of switches of the second stage at the switching frequency, time shifted by the phase delay relative to switching of at least one of the first plurality of switches; and switching at least two of a third plurality of switches of the third stage at the switching frequency, time shifted by the phase shift relative to switching of a member of a group consisting of at least one of the first plurality of switches.

In one embodiment, the method further comprises acts of: determining a delay time based at least in part on the measured plurality of electrical properties; and switching at least two other of the second plurality of switches of the second stage at the switching frequency, time shifted by the delay time relative to switching of the at least two second switches.

In one embodiment, the measuring comprises measuring at least one of a group consisting of a voltage of an energy source connected to one of the plurality of stages and a current in one of the plurality of stages.

In one embodiment, the method further comprises an act of: electrically coupling the plurality of stages through a transformer having a first winding wired to the first stage, a second winding wired to the second stage, and a third winding wired to the third stage.

In one embodiment, a resonance frequency of the second stage is determined substantially by a second stage inductor and a second stage capacitor which are in series with the second winding of the transformer.

In one embodiment, the third stage has a third stage inductor in series with the third winding of the transformer.

In still another aspect, the present disclosure provides a multiple-port converter, comprising: a transformer having a first winding, a second winding and a third winding; a series resonant converter formed by a first power stage and a second power stage; and a dual active bridge converter formed by the first power stage and a third power stage, wherein the first power stage is wired to the first winding, the second power stage is wired to the second winding, and the third power stage is wired to the third winding.

BRIEF DESCRIPTION OF THE DRAWINGS

The present disclosure is better understood upon consideration of the following detailed description and the accompanying figures.

FIG. 7 is a flow chart illustrating a method for controlling a converter to transfer power from voltage source $V_{IN}$ to energy sources $V_{B1}$ and $V_{B2}$, in accordance with embodiments of the present disclosure.

FIGS. 8 and 9 illustrate switch activation control signal waveforms and the corresponding currents for power transfer from energy source $V_{B1}$ to voltage sources $V_{IN}$ and energy source $V_{B2}$, in accordance with embodiments of the present disclosure.

DETAILED DESCRIPTION

The availability of redundant power systems with multiple energy sources can be maximized by providing multiple power paths. As a result, the high-availability system requires multiple bidirectional converters to charge and discharge between energy sources. However, employing multiple bidirectional converters for a system may not be cost effective. For example, to deliver energy among three energy sources in any direction, the system would require six unidirectional converters or three bidirectional converters. A new multiple-port (i.e., three or more ports) bidirectional DC-DC converter and a control method therefor are described. Such converters can be implemented cost effectively and with reduced size.

Figure 4:
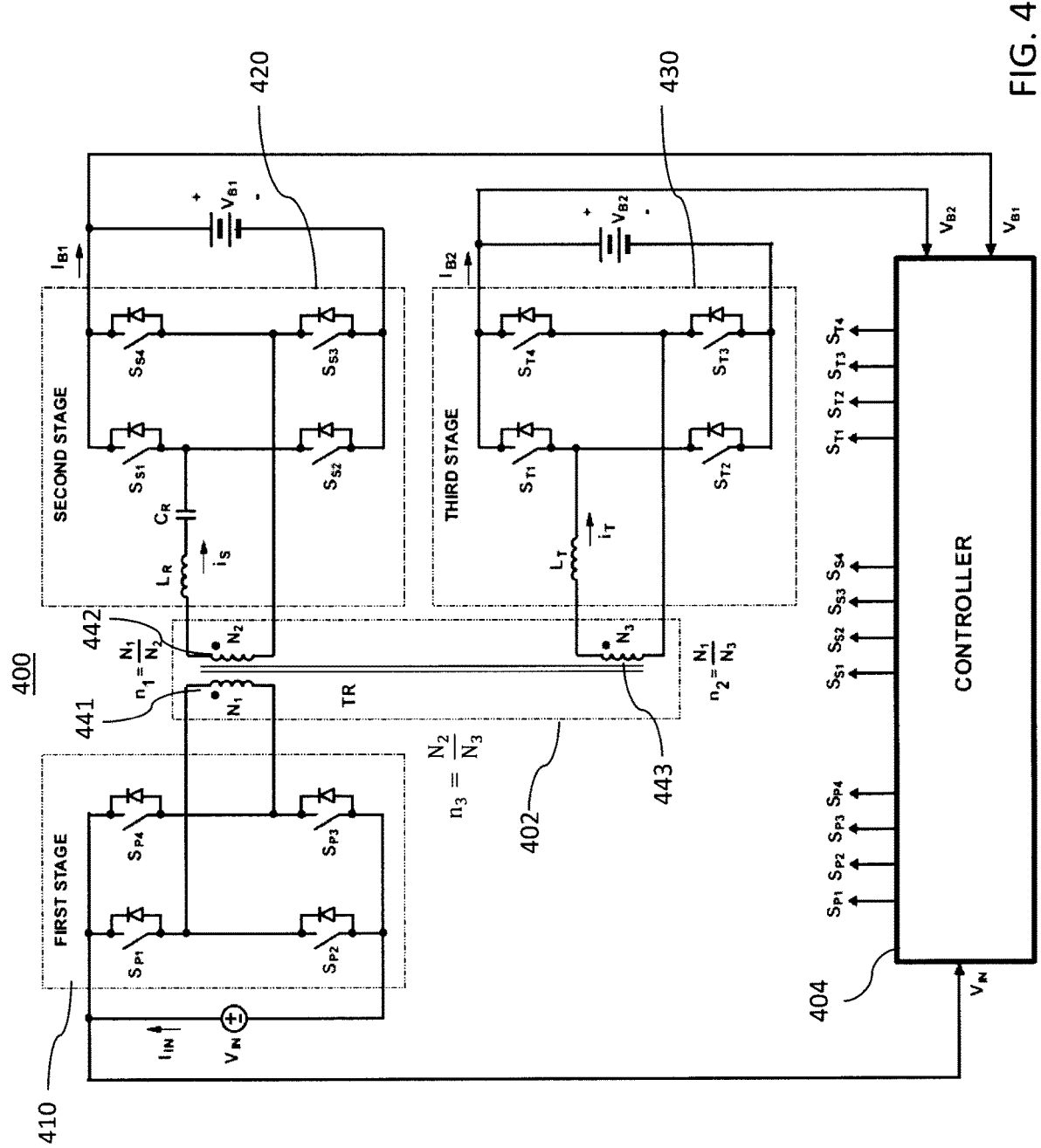
FIG. 4 illustrates a three-port bidirectional DC-DC converter, in accordance with an embodiment of the present disclosure.

FIG. 4 illustrates a three-port bidirectional DC-DC converter 400 in accordance with an embodiment of the present disclosure. As shown in FIG. 4, the power stages of three-port bidirectional DC-DC converter 400 employ an isolation transformer 402 (or TR) with three windings and three power stages. Specifically, converter 400 includes transformer 402 having first, second, and third windings 441, 442, and 443 respectively, magnetically coupled to each other (with or without a magnetic core), a first stage circuit 410 electrically coupled to first winding 441, a second stage circuit 420 electrically coupled to second winding 442, a third stage circuit 430 electrically coupled to third winding 443, and a controller 404 electrically coupled to first, second and third circuits 410, 420, and 430, so as to deliver energy and regulate downstream voltages or currents in any direction in converter 400. First winding 441 has $N_1$ turns, second winding 442 has $N_2$ turns and third winding 443 and $N_3$ turns, where $N_1$, $N_2$ and $N_3$ are positive integers. The ratio of $N_1$ to $N_2$ is defined as $n_1$ (i.e., $n_1 = N_1/N_2$), the ratio of $N_1$ to $N_3$ is defined as $n_2$ (i.e., $n_2 = N_1/N_3$), and the ratio of $N_2$ to $N_3$ is defined as $n_3$ (i.e., $n_3 = N_2/N_3$). While first stage 410 is shown with a voltage source and second and third stages 420 and 430 are shown with batteries, it should be appreciated that each stage may be connected to any suitable energy source. In some embodiments, stage circuits 410, 420, and 430 are electrically coupled to the respective windings of transformer 402 by wiring as shown in FIG. 4. Controller may also be electrically coupled by wiring to stage circuits 410, 420, and 430. Other forms of electrical coupling may be used in other embodiments.

In one embodiment, first stage circuit 410 of converter 400 comprises a plurality of switches $S_{P1}$, $S_{P2}$, $S_{P3}$, and $S_{P4}$ and is coupled between an energy source $V_{IN}$ (e.g., a DC power source converted from a household AC power outlet) and first winding $N_1$; second stage circuit 420 of converter 400 comprises a plurality of switches $S_{S1}$, $S_{S2}$, $S_{S3}$, and $S_{S4}$, a resonant capacitor, $C_R$, and a resonant inductor, $L_R$; and third stage circuit 430 comprises a plurality of switches $S_{T1}$, $S_{T2}$, $S_{T3}$, and $S_{T4}$ and a series inductor, $L_T$. Second stage circuit 420 is coupled between an energy source $V_{S1}$ (e.g., a high voltage battery with an output voltage of about 250 to 500 Volts) and second winding $N_2$, while third stage circuit 430 is coupled between an energy source $V_{B2}$ (e.g., a low voltage battery with an output voltage of about 5 to 50 Volts) and third winding $N_3$. Resonant capacitor, $C_R$, and a resonant inductor, $L_R$, may have a resonant frequency associated therewith which may be computed in radians as the inverse of the square root of the product of the capacitance and inductance in SI units (i.e., $\omega_o = 1/\sqrt{L_R C_R}$. The power stage switches may be implemented as MOSFETs, relays, bipolar junction transistors, Darlington transistors, or any suitable switching technology.

First stage 410 or third stage 430 may be operated in combination with second stage 420 as a series resonant converter. That is, topologically, the circuit formed by first stage 410 and second stage 420 (or second stage 420 and third stage 430) when the remaining stage (i.e., third, or first, respectively) is ignored is a series resonant converter circuit. A series resonant converter is a converter with an associated resonance frequency determined by an effective capacitance and an effective inductance which are in series with one another. "Effective" is used here to refer to the lump element equivalent. The various inductors and capacitors may be implemented as lumped elements, a network of lumped elements, as a distributed element (or "parasitic" effect) or any other suitable way or combination of ways. In some embodiments, a series resonant converter has a resonance frequency between about 40 kHz and 300 kHz (e.g., 80 kHz), though this range is exemplary and any suitable resonance frequency may be used.

First stage 410 and third stage 430 may be operated in combination as a dual active bridge (DAB) converter. That is, topologically, the circuit formed by first stage 410 and third stage 430, when second stage 420 is ignored is a DAB converter. A DAB converter is a converter with an effective series inductance between the two isolated switching stages. "Effective" is used here to refer to the lump element equivalent. The various inductors may be implemented as lumped elements, a network of lumped elements, as a distributed element (or "parasitic" effect) or any other suitable way or combination of ways.

Advantageously, converter 400 allows for one of the series resonant converter topologies and the DAB converter topology to be operated simultaneously, and in some embodiments, in ways essentially identical, or quite similar to conventional operation of a series resonant converter and DAB converter. Still other modes of operation of converter 400 allow for power transfer between arbitrary ports of converter 400. Control of converter 400 are further discussed in connection with controller 404 and FIGS. 5-16.

Controller 404 is used to measure the current conditions of converter 400 to facilitate controlled operation. Controller 404 may for example, include circuitry to measure voltage and current at various points in the converter circuit. Controller 404 includes control logic to implement variable-frequency control, phase-delay control, delay-time control, phase shift control, and other forms of control or combinations of control algorithms to control converter 400. Controller 404 may be implemented as a central processing unit (CPU), digital signal processor (DSP), general or special purpose microprocessor, microcontroller, field programmable gate array (FPGA), application-specific integrated circuit (ASIC) or any suitable device or combination of devices capable of controlling converter 400. In some embodiments, controller 404 may utilize an analog to digital converter (ADC) to sample signal levels and a pulse-width modulator (PWM) to control switching. Though, controller 404 may be implemented in any suitable way.

It should be noted that in some implementations, it may be necessary to couple an electromagnetic interference (EMI) filter between each energy source and each power stage of converter 400. Since the EMI filters are irrelevant to the converter operation of the present disclosure, such filters are not shown in FIG. 4 so as to simplify the drawings and the related discussions.

In one embodiment, converter 400 may deliver electrical energy from energy source $V_{IN}$ (first stage) to energy sources $V_{B1}$ and $V_{B2}$ (second and third stages) by a single controller 404 that independently controls charging currents to energy sources $V_{B1}$ and $V_{B2}$. Likewise, electrical energy of energy source $V_{B1}$ (second stage) can be delivered to energy source $V_{IN}$ (first stage) and energy source $V_{B2}$ (third stage). Likewise, electrical energy of energy source $V_{B2}$ (third stage) can be delivered to energy source $V_{IN}$ (first stage) and battery $V_{B1}$ (second stage) by the independently controlled charging currents. Any stage can be effectively disconnected from power transfer by opening all its respective switches while electrical energy is transferred between the remaining two ports. For example, energy source $V_{IN}$ may be disconnected by opening switches $S_{P1}$, $S_{P2}$, $S_{P3}$, and $S_{P4}$ and can be delivered from energy source $V_{B1}$ to energy source $V_{B2}$, and vice versa. That is, three-port bidirectional DC-DC converter 400 as shown in FIG. 4 can deliver electrical energy and regulate downstream voltages or currents in any direction. To independently regulate voltages or currents of multiple outputs, a variable-frequency control, a delay time control, a phase-shift control, or the combination of two or three controls is employed.

Figure 1A:
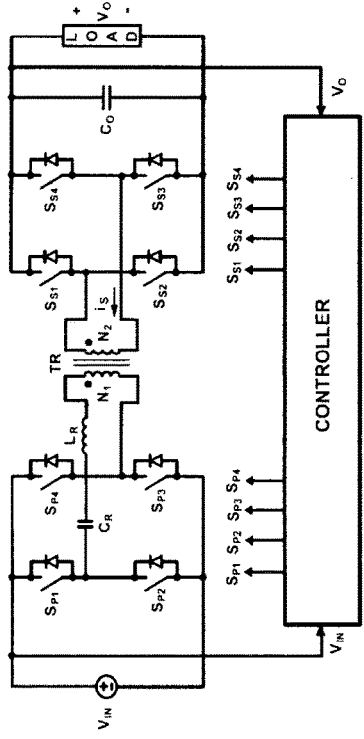
FIGS. 1A and 1B respectively illustrate a typical isolated resonant converter topology and its ideal operating waveforms.
Figure 1B:
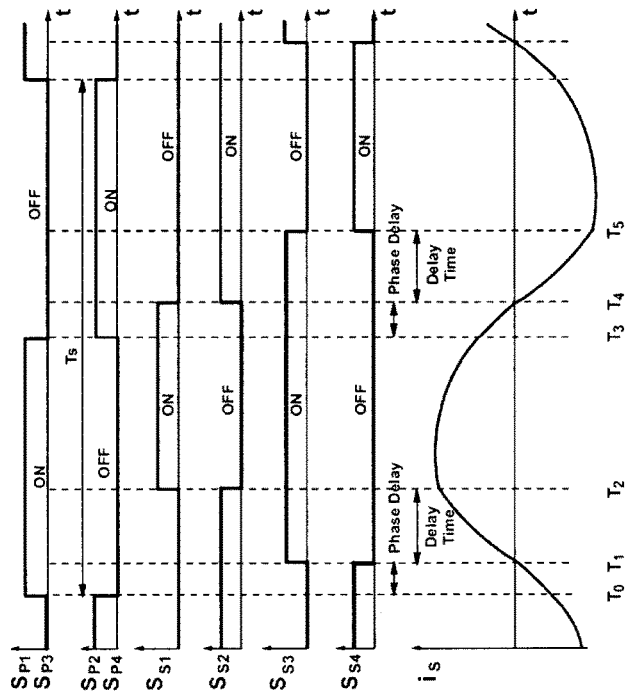
Figure 2A:
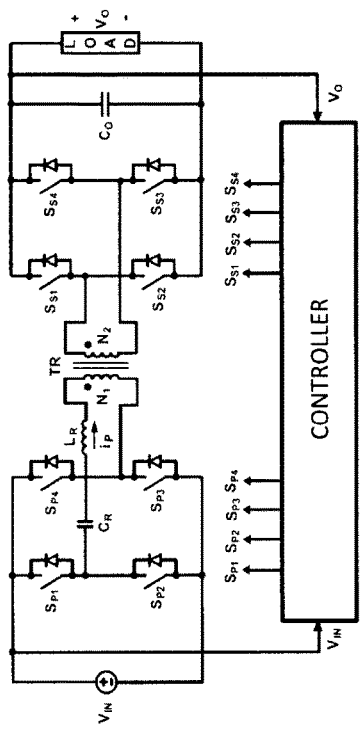
FIGS. 2A and 2B, respectively illustrates another typical isolated resonant converter topology and its ideal operating waveforms.
Figure 2B:
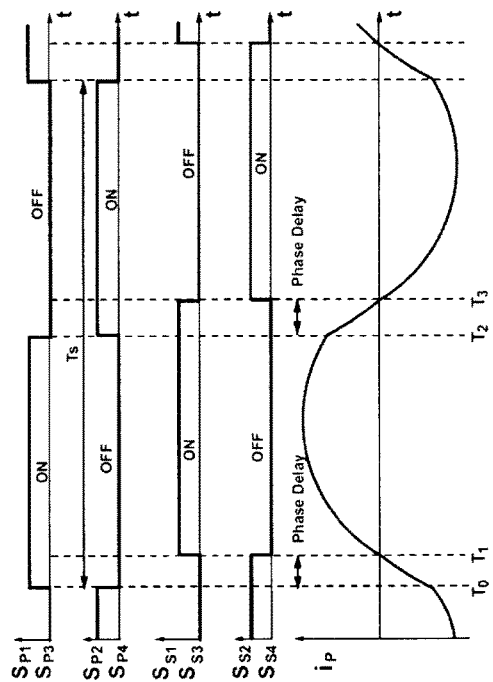
Figure 3A:
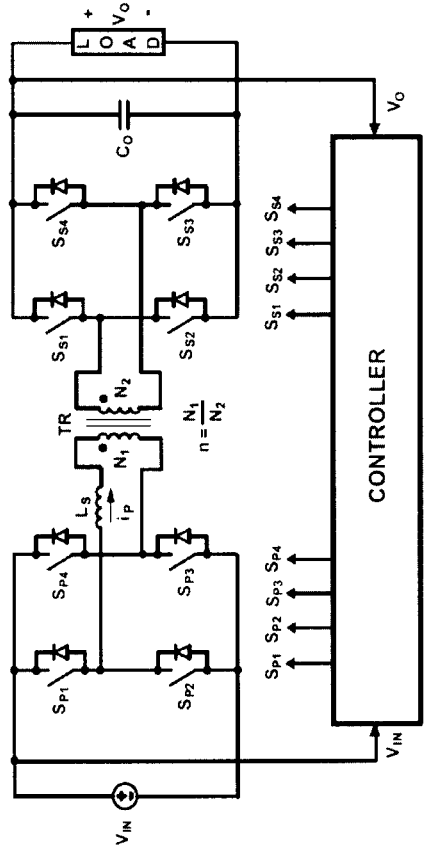
FIGS. 3A and 3B respectively illustrate a circuit diagram of a DAB converter and its ideal operating waveforms.
Figure 3B:
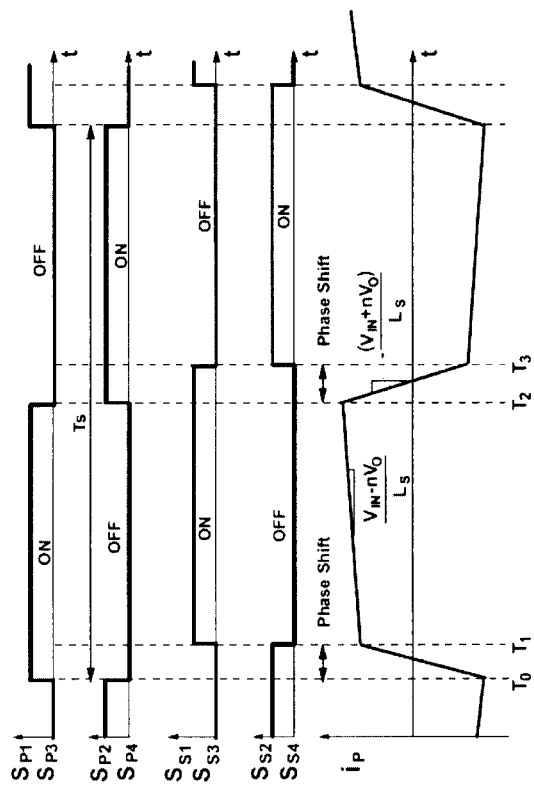

It should be appreciated that the three-port bidirectional DC-DC converter 400 substantially reduces the number of components that is needed to transfer electrical energy arbitrarily between stages when compared to conventional solutions which would require six unidirectional or three bidirectional converters such as the types shown in FIGS. 1A, 2A, and 3A.

Figure 6:
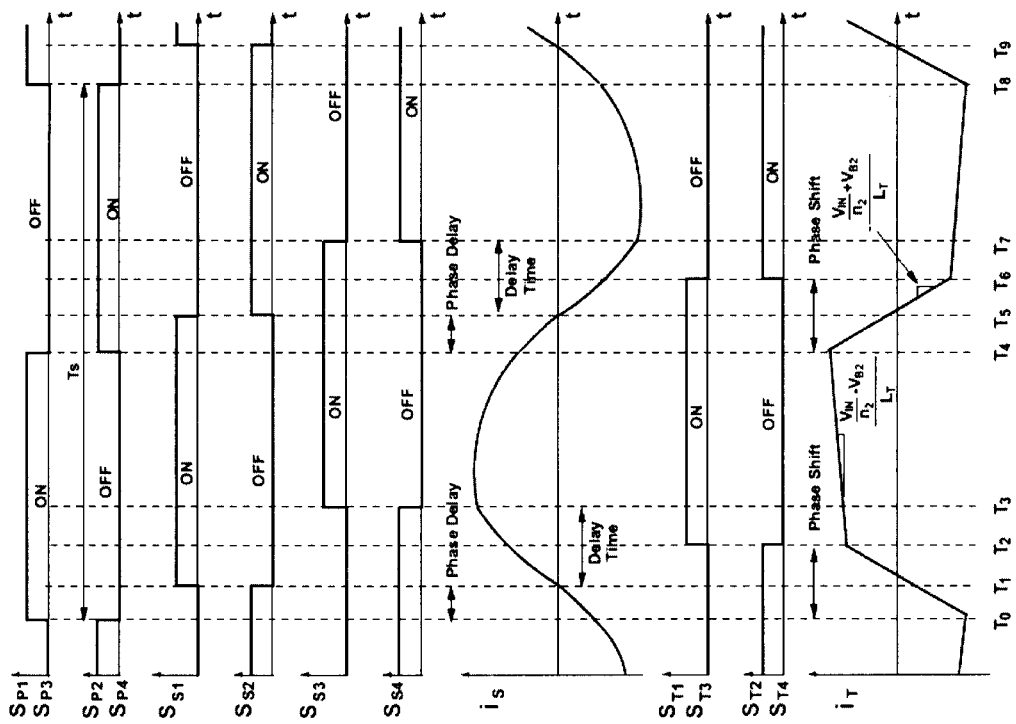
FIGS. 5 and 6 illustrate switch activation control signal waveforms and the corresponding currents for power transfer from voltage source $V_{IN}$ to energy sources $V_{B1}$ and $V_{B2}$, in accordance with embodiments of the present disclosure.
Figure 5:
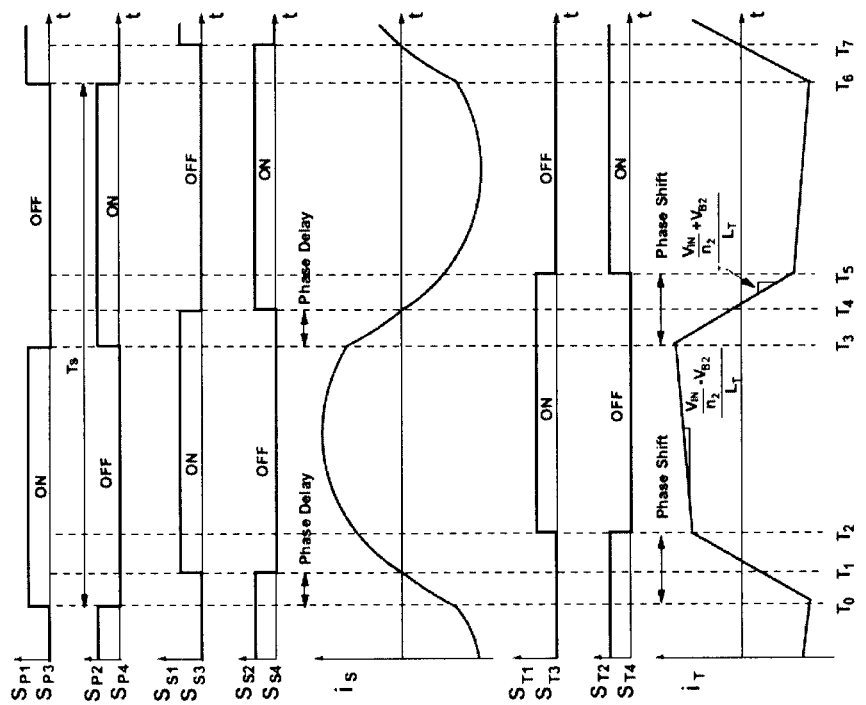

FIGS. 5 and 6 illustrate switch activation control signal waveforms and the corresponding currents for three-port bidirectional DC-DC converter 400 of FIG. 4. Specifically, both FIGS. 5 and 6 illustrate power transfer from energy source $V_{IN}$ to energy sources $V_{B1}$ and $V_{B2}$, in accordance with some embodiments of the present disclosure. In this type of operations first stage 410 and second stage 420 operate as a series resonant converter to transfer energy from $V_{IN}$ to $V_{B1}$, and first stage 410 and third stage 430 operate as a DAB converter to transfer energy from $V_{IN}$ to $V_{B2}$. In FIG. 5, the voltage of energy source $V_{IN}$ is greater than $n_1$ times the voltage of energy source $V_{B1}$ (i.e., $V_{IN} > n_1 V_{B1}$). In FIG. 6, the voltage of energy source $V_{IN}$ is less than or equal to $n_1$ times the voltage of energy source $V_{B1}$ (i.e., $V_{IN} \leq n_1 V_{B1}$).

Referring to FIG. 5, waveforms for the first stage switches ($S_{P1}$ through $S_{P4}$), second stage switches ($S_{S1}$ through $S_{S4}$), and third stage switches ($S_{T1}$ through $S_{T4}$) are shown. Variable-frequency control is used to control the switching frequency of the first stage switches $S_{P1}$ through $S_{P4}$. The second and third stage switches operate at the same frequency as the first stage switches and all switches have identical duty cycles of approximately 50%. To achieve zero-voltage-switching (e.g., current $i_S=0$ at time point $T_1$) of the complementary-operated switches of the same leg, a small dead time is introduced between the turn-on and turn-off instants of the complementary-operated switches. In some embodiments, the dead time may be one or more orders of magnitude shorter than the switching period (inverse of the switching frequency). For example, at time $T_1$ switch $S_{S2}$ is switched OFF slightly before switch $S_{S1}$ is switched ON so that both switches in the $S_{S1}$ and $S_{S2}$ leg of the second stage are briefly simultaneously OFF. The variable-frequency control used to operate switches $S_{P1}$ through $S_{P4}$ of first stage circuit 410 induces the resonant current $i_S$ that determines a charge current $I_{B1}$ of energy source $V_{B1}$.

Phase delay control is used to operate switches $S_{S1}$ through $S_{S4}$ of second stage circuit 420 as synchronous rectifiers, i.e., switches $S_{S1}$ and $S_{S3}$ are turned ON when resonant current $i_S$ is positive (e.g., between time points $T_1$ and $T_4$), while switches $S_{S2}$ and $S_{S4}$ are turned ON when resonant current $i_S$ is negative (e.g., between time points $T_4$ and $T_7$). This effectively introduces a phase delay (e.g., from time point $T_0$ to time point $T_1$) to the waveforms for switches $S_{S1}$ through $S_{S4}$ with respect to the waveforms for switches $S_{P1}$ through $S_{P4}$.

Phase shift control is used to control the turn ON and OFF moments of switches $S_{T1}$ through $S_{T4}$ of third stage circuit 430. The switching is synchronized with the addition of a phase shift from the turn ON and OFF moments of switches $S_{P1}$ through $S_{P4}$ of first stage circuit 410. The amount of phase shift (e.g., from time point $T_0$ to time point $T_2$) determines the magnitude of current $i_T$ which is proportional to the charge current $I_{B2}$ of energy source $V_{B2}$.

Referring to FIG. 6, a delay time (e.g., from time point $T_1$ to time point $T_3$) is added to actively control switches $S_{S1}$ through $S_{S4}$ of second stage circuit 420. During the delay time, winding 442 of transformer 402 is shorted by switches $S_{S1}$ and $S_{S4}$ of second stage circuit 420, which boosts resonant current $i_S$, as shown in FIG. 6. As a result, charge current $I_{B1}$ of energy source $V_{B1}$ can be regulated not only by the switching frequency but also by the delay time. The primary function of the delay time control is to improve operating efficiency by reducing the control frequency range and/or increase the voltage gain of converter 400, because the magnitude of resonant current $i_S$ can also be controlled by the delay time. Note that the second and third stage switches still operate at the same frequency as the first stage switches (which are controlled by variable frequency control) and all switches have identical duty cycles of approximately 50%. Also, the introduction of delay time control in this configuration does not substantially alter the performance of the DAB converter transferring power from the first to third stages. The timing of third stage switches $S_{T1}$ through $S_{T4}$ is with reference to the first stage switches $S_{P1}$ through $S_{P4}$ and not the second stage switches $S_{S1}$ through $S_{S4}$.

FIG. 7 is a flow chart illustrating a method 700 for controlling converter 400 to transfer power from energy source $V_{IN}$ to energy sources $V_{B1}$ and $V_{B2}$, in accordance with embodiments of the present disclosure.

In Step 710, a first stage controller of controller 404 begins with sensing or estimating voltage and/or currents across or through various elements in converter 400. The specific voltages and currents to be sensed an estimated may depend on the specific techniques used to implement variable-frequency control, phase delay control, delay time control, and phase shift control. For example, the voltages of energy source $V_{IN}$ and energy sources $V_{B1}$ and $V_{B2}$, as well as currents $i_S$, $i_T$, $I_{B1}$, and $I_{B2}$ may be measured or estimated. Any suitable technique may be used to measure or estimate the voltages and currents including indirect measurements. For example, an analog to digital converter (ADC) may be used.

In Step 720, controller 404 determines the switching frequency for the variable-frequency control used to regulate current $I_{B1}$ and/or voltage $V_{B1}$. Any suitable approach to implementing variable-frequency control may be used to determine the switching frequency. See for example and not limitation, References [1], [2], and [4]. In some embodiments of the disclosure, variable-frequency control can be implemented in essentially the same ways it is implemented for conventional resonant converter topologies such as the circuits shown in FIGS. 1A and 2A.

In Step 730, the phase delay needed for phase delay control is determined. The phase delay may be determined by detecting or estimating the zero-crossing moment of resonant current $i_S$. This timing is used to determine the phase delay and thereby the turn ON and OFF time of switches $S_{S1}$-$S_{S4}$ of second stage circuit 420 thereby calculating the phase delay. The phase delay time may be determined as the time between switching of a switch in the primary stage and the zero-crossing moment of resonant current $i_S$. Though, phase delay may be determined in any suitable way. For example and not limitation, see References [1] and [2].

In Step 740, the delay time needed to implement delay time control is determined. The delay time may be based on the voltages of energy source $V_{IN}$ and energy source $V_{B1}$ as well as currents $i_S$ and $I_{B1}$, so as to achieve additional control of switches $S_{S1}$ through $S_{S4}$ of second stage circuit 420. It should be noted that the delay time is set to zero for the embodiment of FIG. 5, while the delay time is added for the embodiment of FIG. 6. In some embodiments of the disclosure, delay-time control is implemented in ways similar to those described in U.S. Pat. No. 9,490,704, and References [1] and [2].

In Step 750, the phase shift needed for phase shift control is determined so as to regulate current $I_{B2}$ or voltage $V_{B2}$. Phase shift control may be implemented in any suitable way. For example and not limitation, see References [3], [5], and [6]. In some embodiments, the phase shift is based on the voltage of energy source $V_{IN}$, current $I_{B2}$, series inductance $L_T$, and the switching frequency. Note that the phase shift in FIGS. 5 and 6 is relative to one or more of the switches in first stage 410, that is the stage where power is originating.

In Step 760, controller 404 updates the switching frequency, the phase delay, the delay time, and the phase shift. These may be implemented by writing in the appropriate value into corresponding pulse-width modulator (PWM) registers.

After step 760, converter 400 may continue operation from the start. In this way variable-frequency control, phase-delay control, delay-time control, and phase-shift control can continually adjust the timing of the control switches to achieve the needed power transfer efficiently.

The method for controlling converter 400 includes combinations of the variable-frequency control, the delay time control, and the phase shift control. In one embodiment, all switches operate with the same switching frequency and have identical duty ratios of approximately 50%. To achieve ZVS of the complementary-operated primary switches, a small dead time is provided between the turn-on and turn-off instants of these switches. To independently regulate voltages or currents of multiple outputs, the variable-frequency control, the delay time control, the phase shift control, and/or a combination of two or three of these controls can be employed. For example, one can vary the switching frequency for all switches to adjust the charging current between first and second stage circuits 410 and 420. Further, while keeping the switching frequency the same, one can vary the phase shift for switches $S_{T1}$ through $S_{T4}$ to adjust the charging current between first and third stage circuits 410 and 430.

It should be appreciated that some embodiments of method 700 will exclude certain steps or may perform the steps in a different order. As one example, some embodiments may skip step 740 for determining the delay time control.

Figure 9:
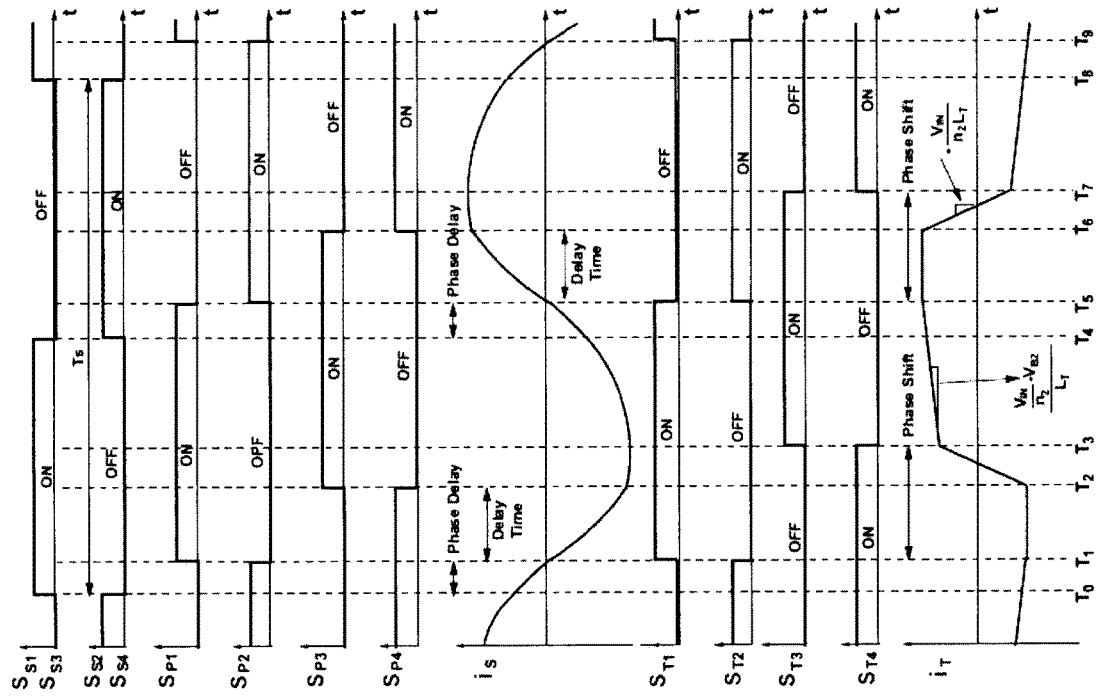

FIGS. 8 and 9 illustrate switch activation control signal waveforms and the corresponding currents for power transfer from energy source $V_{B1}$ to energy source $V_{IN}$ and energy source $V_{B2}$, in accordance with embodiments of the present disclosure. In the illustrations of FIGS. 8 and 9, first stage 410 and second stage 420 operate as a series resonant converter to transfer energy from $V_{B1}$ to $V_{IN}$, and first stage 410 and third stage 430 operate as a DAB converter to transfer energy from $V_{IN}$ to $V_{B2}$. Note that operationally energy is not directly transferred from $V_{B1}$ to $V_{B2}$, but rather energy is transferred from $V_{B1}$ to $V_{IN}$ and a portion of the energy delivered to $V_{IN}$ is delivered to $V_{B2}$. This is because direct transfer from second stage 420 to third stage 430 would require operating these stages as a series resonant converter. However, it is not possible to simultaneously operate both second to first stage power transfer and second to third stage power transfer by means of series resonant converter using this circuit topology.

Finally, before discussing FIGS. 8 and 9 it is noted that the choice of presenting operation where the first and second stages as a series resonant converter as opposed to operating the second and third stages as a series resonant converter was arbitrary. It should be appreciated that the later may be implemented by appropriately altering operation of controller 404.

In the embodiment of FIG. 8, the voltage of energy source $V_{B1}$ is greater than the voltage of voltage source $V_{IN}$ divided by $n_1$ (i.e., $V_{B1} > V_{IN}/n_1$). In FIG. 8, waveforms for the first stage switches ($S_{P1}$ through $S_{P4}$), second stage switches ($S_{S1}$ through $S_{S4}$), and third stage switches ($S_{T1}$ through $S_{T4}$) are shown. Variable-frequency control is used to control the switching frequency of the second stage switches $S_{S1}$ through $S_{S4}$. The first and third stage switches operate at the same frequency as the second stage switches and all switches have identical duty cycles of approximately 50%. The variable-frequency control used to operate switches $S_{S1}$ through $S_{S4}$ of second stage circuit 420 induces the resonant current $i_S$ that determines a charge current $I_{IN}$ of voltage source $V_{IN}$.

Phase delay control is used to operate switches $S_{P1}$ through $S_{P4}$ of first stage circuit 410 as synchronous rectifiers, i.e., switches $S_{P2}$ and $S_{P4}$ are turned ON when resonant current $i_S$ is positive (e.g., between time points $T_4$ and $T_7$), while switches $S_{P1}$ and $S_{P3}$ are turned ON when resonant current $i_S$ is negative (e.g., between time points $T_1$ and $T_4$). This effectively introduces a phase delay (e.g., from time point $T_0$ to time point $T_1$) to the waveforms for switches $S_{P1}$ through $S_{P4}$ with respect to the waveforms for switches $S_{S1}$ through $S_{S4}$.

Phase shift control is used to control the turn ON and OFF moments of switches $S_{T1}$ through $S_{T4}$ of third stage circuit 430. The switching is synchronized with the addition of a phase shift with respect to the turn ON and OFF moments of switches $S_{P1}$ through $S_{P4}$ of first stage circuit 410. The amount of phase shift (e.g., from time point $T_1$ to time point $T_2$) determines the magnitude of current $i_T$ that is proportional to the charge current $I_{B2}$ of energy source $V_{B2}$. It is important to emphasize here that the phase shift of the third stage switches is relative to the first stage switches, not the second stage switches from which transferred energy is originating. This is because of the choice to operate the first and second stage as a series resonant converter and the first and third stages as a DAB converter.

In the embodiment of FIG. 9, the voltage of energy source $V_{B1}$ is less than or equal to the voltage of energy source $V_{IN}$ divided by $n_1$ (i.e., $V_{B1} \leq V_{IN}/n_1$). Referring to FIG. 9, a delay time (e.g., from time point $T_1$ to time point $T_2$) is added to actively control switches $S_{P1}$ through $S_{P4}$ of first stage circuit 410. During the delay time, winding 441 of transformer 402 is shorted by the switches of first stage circuit 410, which boosts resonant current $i_S$, as shown in FIG. 9. As a result, charge current $I_{IN}$ of energy source $V_{IN}$ can be regulated not only by the switching frequency but also by the delay time. Note that the first and third stage switches still operate at the same frequency as the second stage switches (which are controlled by variable frequency control) and all switches have identical duty cycles of approximately 50%.

Phase shift control of the third stages switches $S_{T1}$ through $S_{T4}$ is affected by the delay time control of the first stage switches $S_{P1}$ through $S_{P4}$. Specifically, when delay time is used to control the first stage switches the waveforms for switches $S_{T1}$ and $S_{T2}$ are essentially identical to switches $S_{P1}$ and $S_{P2}$ (i.e., $S_{P1}$, $S_{P2}$, $S_{T1}$ and $S_{T2}$ change states approximately at the zero crossings of $i_S$). Phase shift control of the stage three switches causes a phase shift of switches $S_{T3}$ and $S_{T4}$ relative to first stage switches $S_{P1}$ and $S_{P2}$. The difference between the conventional phase shift control explained in FIGS. 5, 6 and 8 versus the phase shift control in FIG. 9 is that in FIG. 9, during the delay time control of the first stage switches $S_{P1}$ through $S_{P4}$, the voltage across the inductor $L_T$ is zero.

Referring to FIG. 9, during delay time of first stage switches (e.g., from time point $T_1$ to time point $T_2$), when the third stage switches are phase shifted, current $i_T$ is constant and neither energy is stored at the inductor $L_T$ nor energy is delivered to the output during this time. Therefore, in this operation, effective phase shift (e.g., from time point $T_2$ to time point $T_3$), which is the difference of phase shift and delay time, determines the magnitude of current $i_T$ which is proportional to charge current $I_{B2}$ of energy source $V_{B2}$.

Figure 10:
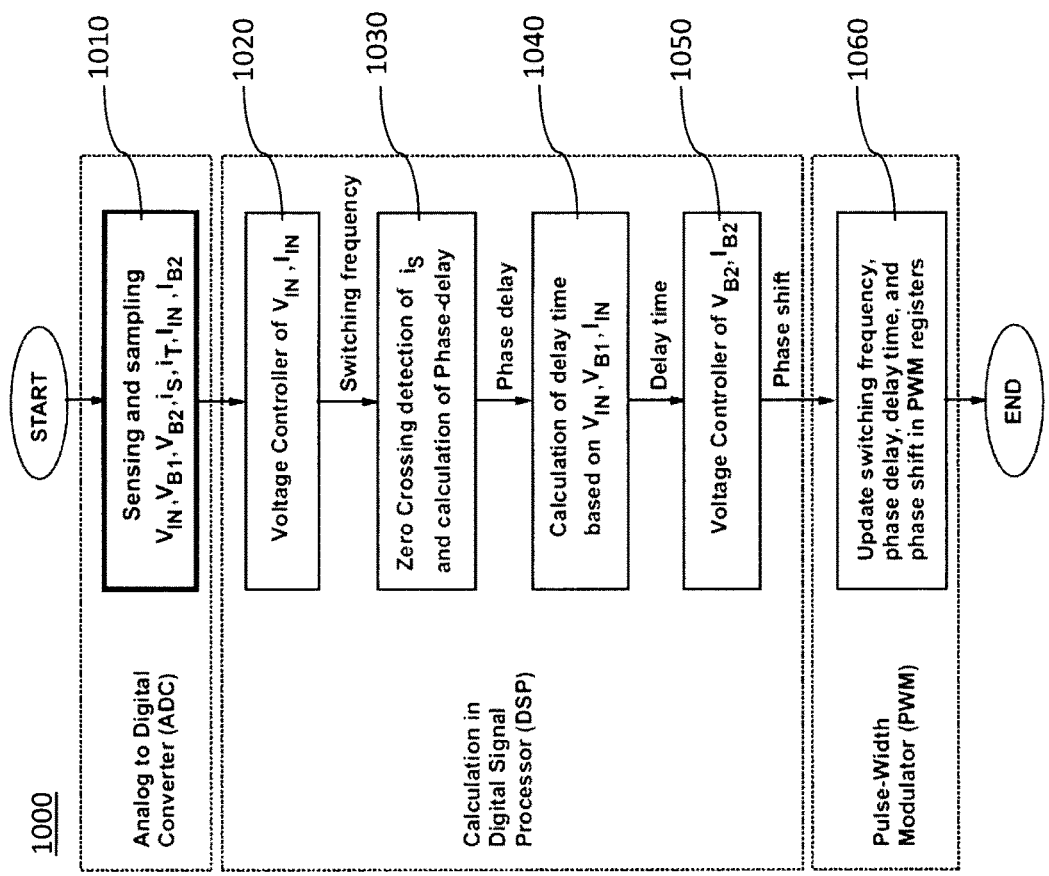
FIG. 10 is a flow chart illustrating a method for controlling a converter to transfer power from energy source $V_{B1}$ to voltage source $V_{IN}$ and energy source $V_{B2}$, in accordance with embodiments of the present disclosure.

FIG. 10 is a flow chart illustrating a method 1000 for controlling converter 400 to transfer power from energy source $V_{B1}$ to voltage source $V_{IN}$ and energy source $V_{B2}$, in accordance with some embodiments of the present disclosure. It should be appreciated that certain steps of method 1000 may be performed in ways similar to those described in connection with method 700 (FIG. 7); though, method 1000 may be performed in any suitable way.

In Step 1010, controller 404 begins with sensing or estimating the voltages of voltage source $V_{IN}$ and energy sources $V_{B1}$ and $V_{B2}$, as well as currents $i_S$, $i_T$, $I_{B1}$, and $I_{B2}$.

In Step 1020, controller 404 determines the switching frequency to regulate current $I_{IN}$ and/or voltage $V_{IN}$.

In Step 1030, the zero-crossing moment of resonant current $i_S$ is detected or estimated so as to determine the turn ON and OFF time of switches $S_{P1}$ through $S_{P4}$ of first stage circuit 410 thereby calculating the phase delay.

In Step 1040, the delay time is determined based on the voltages of voltage source $V_{IN}$ and energy source $V_{B1}$ as well as currents $i_S$ and $I_{IN}$, so as to achieve additional control of switches $S_{P1}$ through $S_{P4}$ of first stage circuit 410. It should be noted that the delay time is set to zero for the embodiment of FIG. 8, while the delay time is added for the embodiment of FIG. 9.

In Step 1050, controller 404 determines the amount of phase shift to regulate current $I_{B2}$ or voltage $V_{B2}$.

In Step 1060, controller 404 updates the switching frequency, the phase delay, the delay time, and the phase shift in pulse-width modulator (PWM) registers, and converter 400 resumes its operation from the start.

Figure 12:
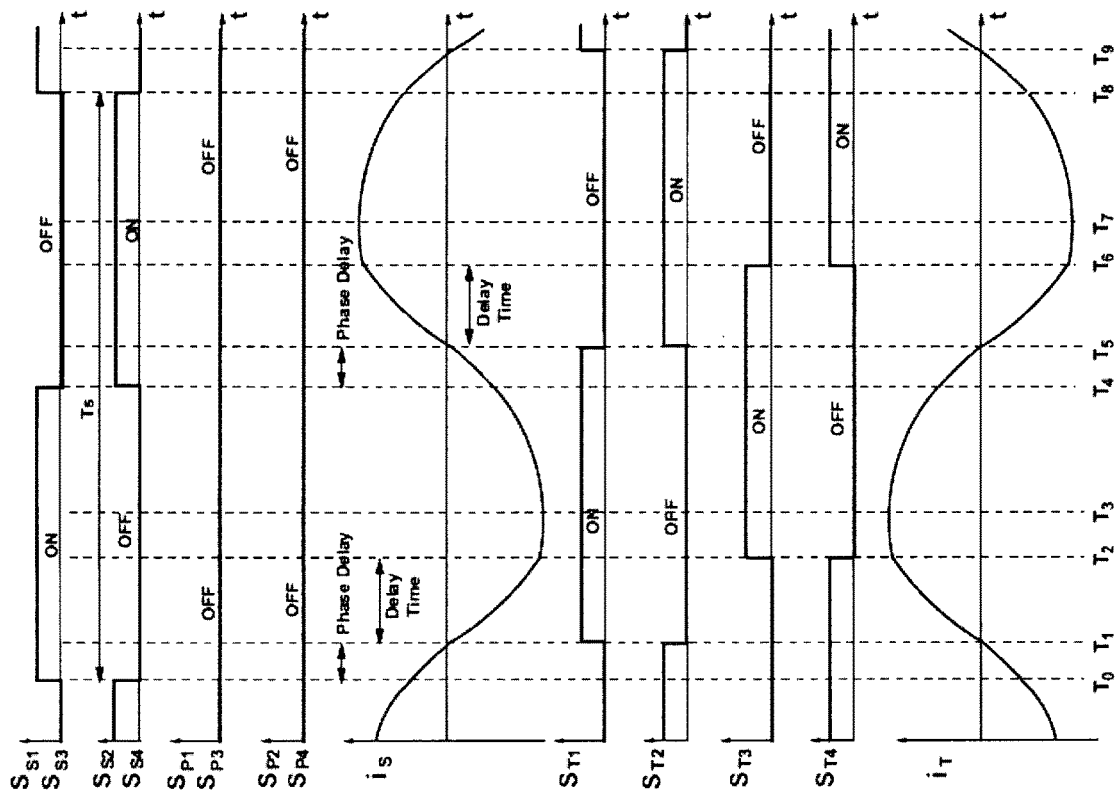
FIGS. 11 and 12 illustrate switch activation control signal waveforms and the corresponding currents for power transfer from energy source $V_{B1}$ to energy source $V_{B2}$, in accordance with embodiments of the present disclosure.
Figure 11:
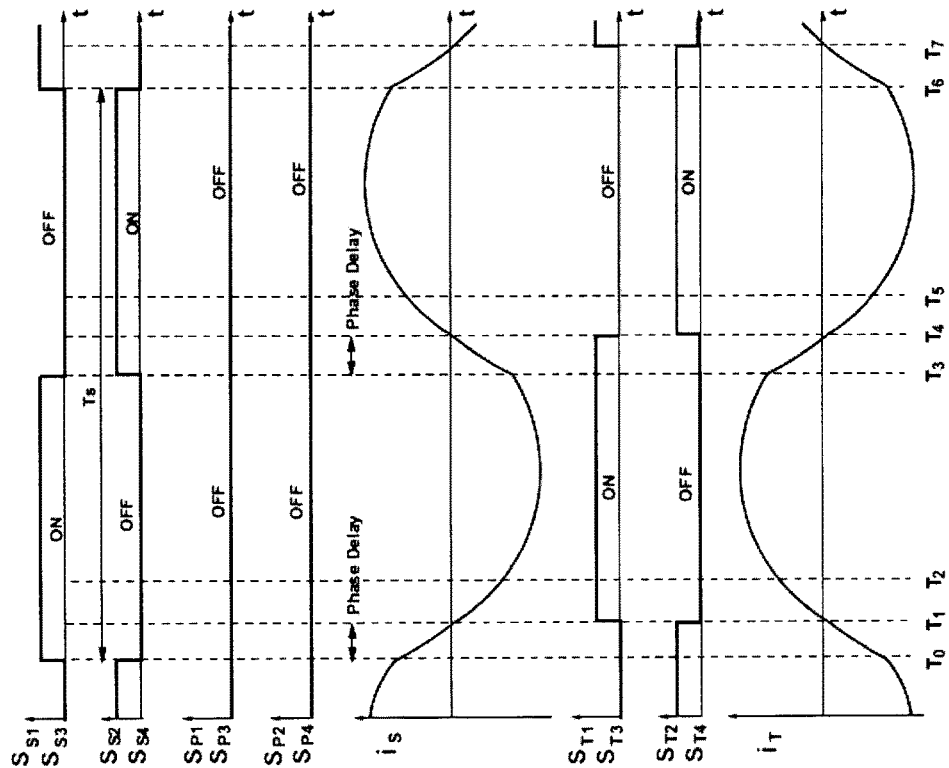

FIGS. 11 and 12 illustrate switch activation control signal waveforms and the corresponding currents for power transfer from energy source $V_{B1}$ to energy source $V_{B2}$, in accordance with embodiments of the present disclosure. In the embodiments of FIGS. 11 and 12, energy source $V_{IN}$ is decoupled by turning off all of switches $S_{P1}$ through $S_{P4}$ of first stage circuit 410. Accordingly, second and third stage circuits 420 and 430 operate as a single input and single output converter. Specifically, the second and third stages act as a series resonant converter. In the embodiment of FIG. 11, the voltage of energy source $V_{B1}$ is greater than $n_3$ times the voltage of energy source $V_{B2}$ (i.e., $V_{B1} > n_3 V_{B2}$). In the embodiment of FIG. 12, the voltage of energy source $V_{B1}$ is less than or equal to $n_3$ times the voltage of energy source $V_{B2}$ (i.e., $V_{B1} \leq n_3 V_{B2}$).

Referring to FIG. 11, waveforms for $S_{S1}$ through $S_{S4}$ and $S_{T1}$ through $S_{T4}$ operate with the same switching frequency and have identical duty cycles of approximately 50%. The variable-frequency control is used to operate switches $S_{S1}$ through $S_{S4}$ of second stage circuit 420 and hence induces the resonant current $i_S$ and $i_T$ that determines a charge current $I_{B2}$ of energy source $V_{B2}$.

Switches $S_{T1}$ through $S_{T4}$ of third stage circuit 430 operate as synchronous rectifiers, i.e., switches $S_{T1}$ and $S_{T3}$ are turned ON when resonant current $i_T$ is positive (e.g., between time points $T_1$ and $T_4$), while switches $S_{T2}$ and $S_{T4}$ are turned ON when resonant current $i_T$ is negative (e.g., between time points $T_4$ and $T_7$). This effectively introduces a phase delay (e.g., from time point $T_0$ to time point $T_1$) to the waveforms for switches $S_{T1}$ through $S_{T4}$ with respect to the waveforms for switches $S_{S1}$ through $S_{S4}$.

Referring to FIG. 12, a delay time (e.g., from time point $T_1$ to time point $T_2$) is added to actively control switches $S_{T1}$ through $S_{T4}$ of third stage circuit 430. During the delay time, winding $N_3$ of transformer 402 is shorted by the switches of third stage circuit 430, which boosts resonant current $i_S$ and $i_T$ as shown in FIG. 12. As a result, charge current $I_{B2}$ of energy source $V_{B2}$ can be regulated not only by the switching frequency but also by the delay time.

Figures 13, 14:
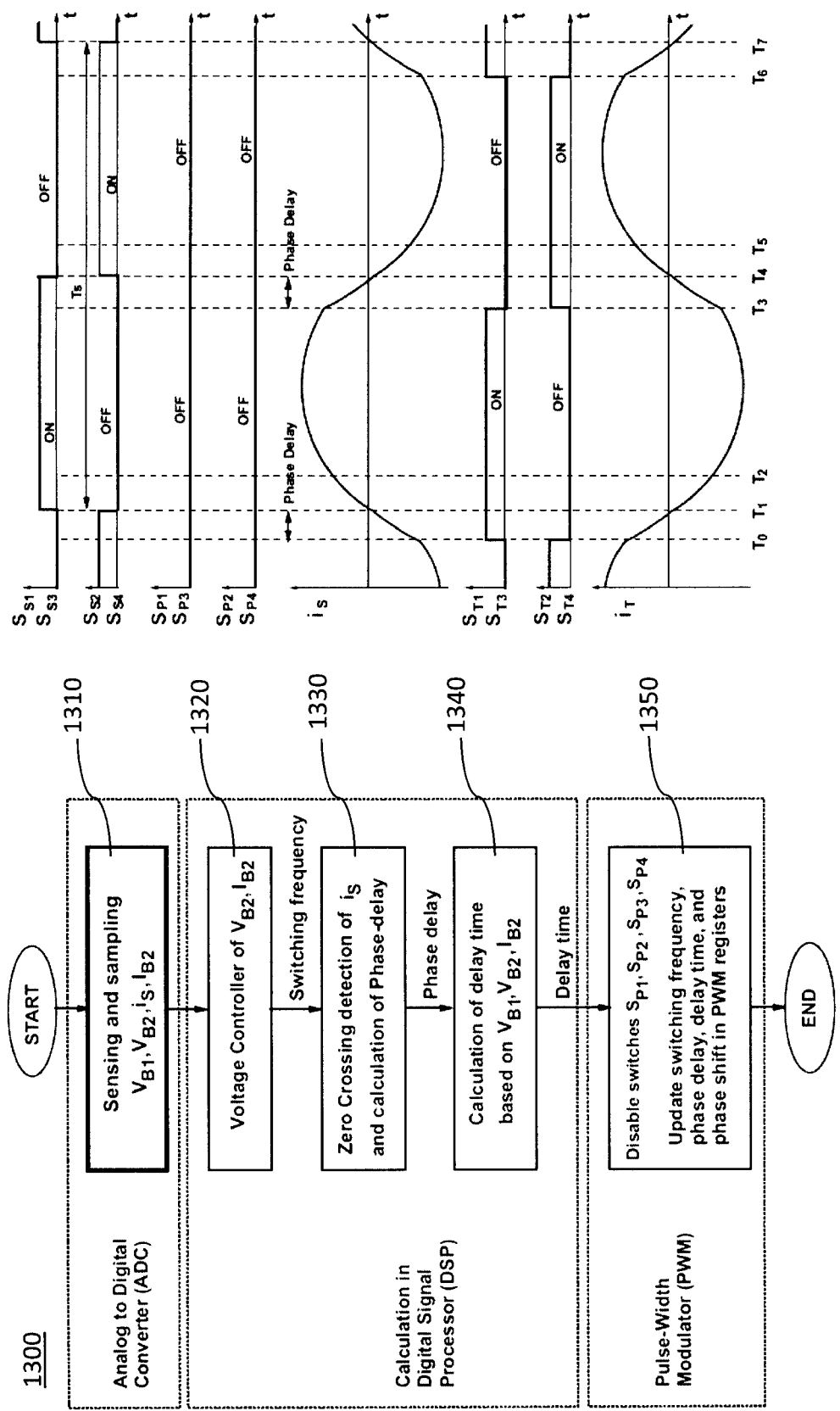
FIG. 13 is a flow chart illustrating a method for controlling converter to transfer power from energy source $V_{B1}$ to energy source $V_{B2}$, in accordance with embodiments of the present disclosure.
FIGS. 14 and 15 illustrate switch activation control signal waveforms and the corresponding currents for power transfer from energy source $V_{B2}$ to energy source $V_{B1}$, in accordance with embodiments of the present disclosure.

FIG. 13 is a flow chart illustrating a method 1300 for controlling converter 400 to transfer power from energy source $V_{B1}$ to energy source $V_{B2}$, in accordance with embodiments of the present disclosure.

In Step 1310, controller 404 begins with sensing or estimating the voltages of energy sources $V_{B1}$ and $V_{B2}$, as well as currents $i_S$ and $I_{B2}$.

In Step 1320, controller 404 determines the switching frequency to regulate current $I_{B2}$ and/or voltage $V_{B2}$.

In Step 1330, the zero-crossing moment of resonant current $i_S$ is detected or estimated so as to determine the turn ON and OFF time of switches $S_{T1}$ through $S_{T4}$ of third stage circuit 430 thereby calculating the phase delay.

In Step 1340, the delay time is determined based on the voltages of energy sources $V_{B1}$ and $V_{B2}$ as well as current $I_{B2}$. It should be noted that the delay time is set to zero for the embodiment of FIG. 11, while the delay time (e.g., between time points $T_1$ and $T_2$) is added for the embodiment of FIG. 12.

In Step 1350, controller 404 turns off all of switches $S_{P1}$ through $S_{P4}$ of first stage circuit 410 and updates the switching frequency, the phase delay, the delay time, and the phase shift in pulse-width modulator (PWM) registers, and converter 400 resumes its operation from the start.

Figure 15:
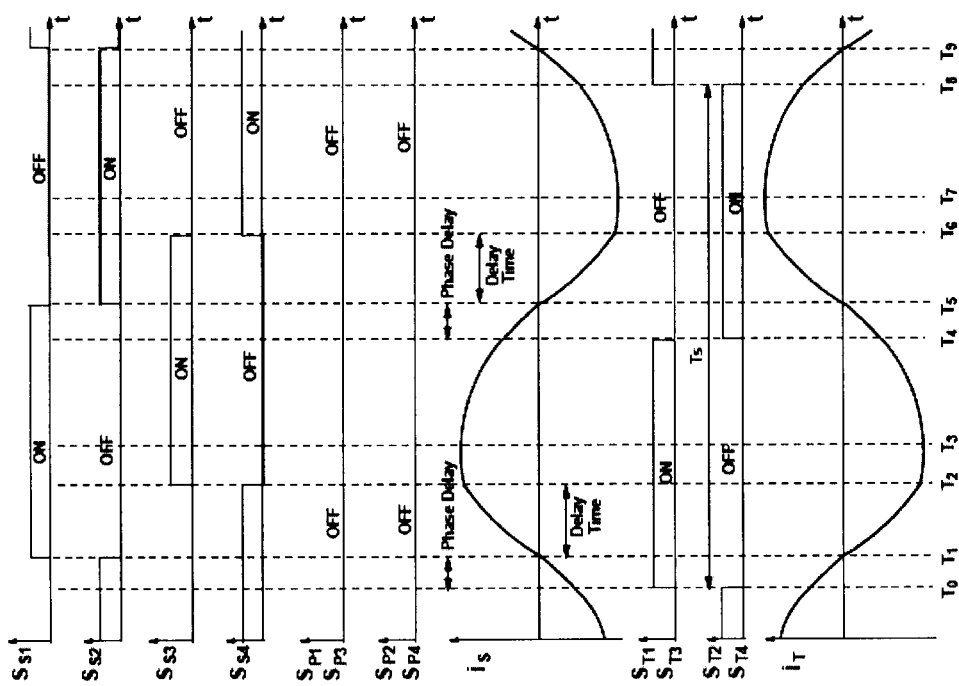

FIGS. 14 and 15 illustrate switch activation control signal waveforms and the corresponding currents for power transfer from energy source $V_{B2}$ to energy source $V_{B1}$, in accordance with embodiments of the present disclosure. In the embodiments of FIGS. 14 and 15, energy source $V_{IN}$ is decoupled by turning off all of switches $S_{P1}$ through $S_{P4}$ of first stage circuit 410. Accordingly, second and third stage circuits 420 and 430 operate as a single input and single output converter. In the embodiment of FIG. 14, the voltage of energy source $V_{B2}$ is greater than $(1/n_3)$ times the voltage of energy source $V_{B1}$. In the embodiment of FIG. 15, the voltage of energy source $V_{B2}$ is less than or equal to $(1/n_3)$ times the voltage of energy source $V_{B1}$.

Referring to FIG. 14, waveforms for $S_{S1}$ through $S_{S4}$ and $S_{T1}$ through $S_{T4}$ operate with the same switching frequency and have identical duty cycles of approximately 50%. The variable-frequency control is used to operate switches $S_{S1}$ through $S_{S4}$ of second stage circuit 420 and hence induces the resonant current $i_S$ and $i_T$ that determines a charge current $I_{B1}$ of energy source $V_{B1}$.

Switches $S_{S1}$ through $S_{S4}$ of second stage circuit 420 operate as synchronous rectifiers, i.e., switches $S_{S1}$ and $S_{S3}$ are turned ON when resonant current $i_S$ is positive (e.g., between time points $T_1$ and $T_4$), while switches $S_{S2}$ and $S_{S4}$ are turned ON when resonant current $i_S$ is negative (e.g., between time points $T_4$ and $T_7$). This effectively introduces a phase delay (e.g., from time point $T_0$ to time point $T_1$) to the waveforms for Switches $S_{S1}$ through $S_{S4}$ with respect to the waveforms for switches $S_{T1}$ through $S_{T4}$.

As shown in FIG. 15, a delay time (e.g., from time point $T_1$ to time point $T_2$) is added to actively control switches $S_{S3}$ and $S_{S4}$ of second stage circuit 420. During the delay time, winding $N_2$ of transformer 402 is shorted by the switches of second stage circuit 420, which boosts resonant current $i_S$ and $i_T$ as shown in FIG. 15. As a result, charge current $I_{B2}$ of energy source $V_{B2}$ can be regulated not only by the switching frequency but also by the delay time.

Figure 16:
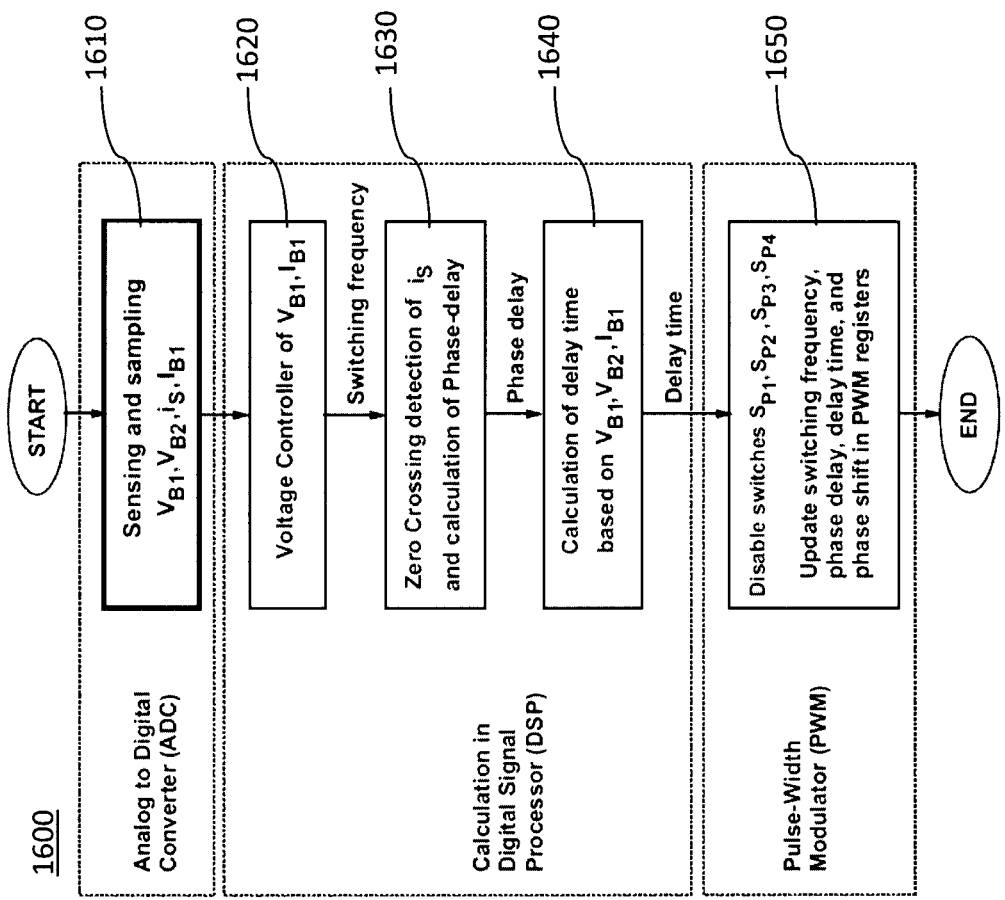
FIG. 16 is a flow chart illustrating a method for controlling a converter to transfer power from energy source $V_{B2}$ to energy source $V_{B1}$, in accordance with embodiments of the present disclosure

FIG. 16 is a flow chart illustrating a method 1600 for controlling converter 400 to transfer power from energy source $V_{B2}$ to energy source $V_{B1}$, in accordance with embodiments of the present disclosure.

In Step 1610, controller 404 begins with sensing or estimating the voltages of energy sources $V_{B1}$ and $V_{B2}$, as well as currents $i_S$ and Isl.

In Step 1620, controller 404 determines the switching frequency to regulate current $I_{B1}$ and/or voltage $V_{B1}$.

In Step 1630, the zero-crossing moment of resonant current $i_S$ is detected or estimated so as to determine the turn ON and OFF time of switches $S_{S1}$ through $S_{S4}$ of second stage circuit 420 thereby calculating the phase delay.

In Step 1640, the delay time is determined based on the voltages of energy sources $V_{B1}$ and $V_{B2}$ as well as current $I_{S1}$. It should be noted that the delay time is set to zero for the embodiment of FIG. 14, while the delay time (e.g., between time points $T_1$ and $T_2$) is added for the embodiment of FIG. 15.

In Step 1650, controller 404 turns off all of switches $S_{P1}$ through $S_{P4}$ of first stage circuit 410 and updates the switching frequency, the phase delay, the delay time, and the phase shift in pulse-width modulator (PWM) registers, and converter 400 resumes its operation from the start.

Figure 17:
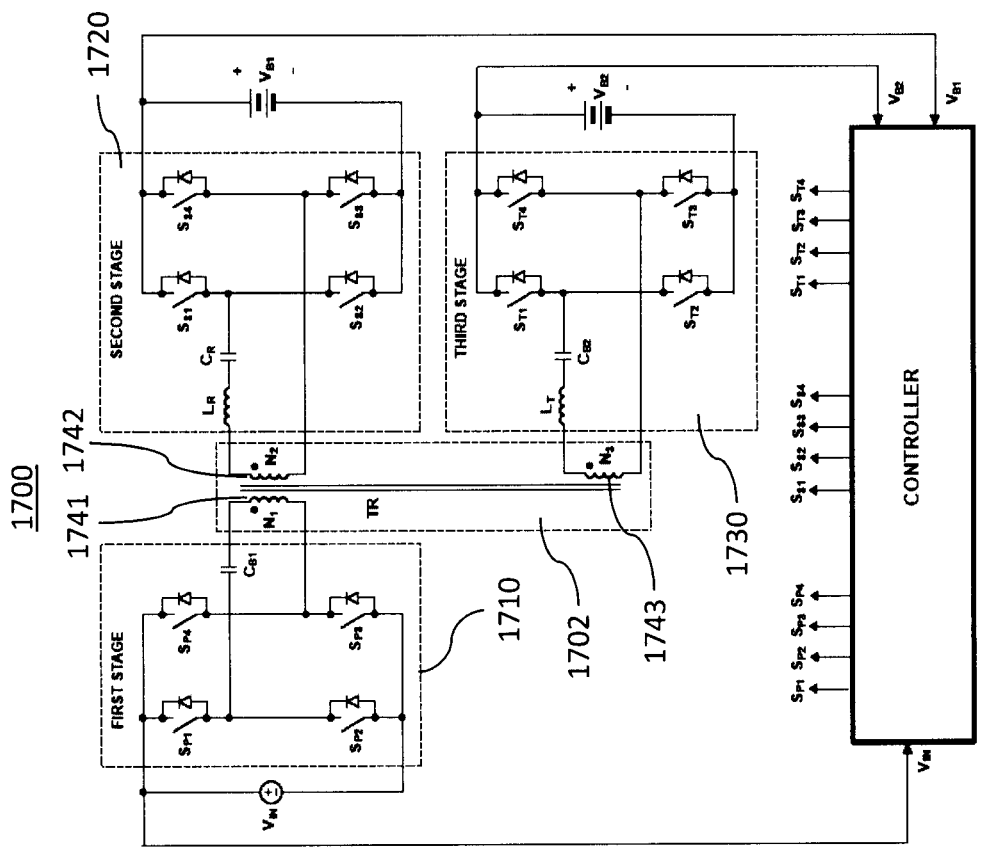
FIG. 17 illustrates a triple-port bidirectional DC-DC converter, in accordance with another embodiment of the present disclosure.

FIG. 17 illustrates a triple-port bidirectional DC-DC converter 1700 in accordance with another embodiment of the present disclosure. Converter 1700 in FIG. 17 is substantially the same as converter 400 in FIG. 4, except that converter 1700 is implemented to include a blocking capacitor $C_{B1}$ in first stage circuit 1710 and a blocking capacitor $C_{B2}$ for third stage circuit 1730. To prevent saturation of transformer 1702 caused by unequal positive and negative volt-seconds applied across transformer 1702 due to uneven duty-cycles of the switches and unequal voltage drops across the switches, blocking capacitors $C_{B1}$ and $C_{B2}$ are serially coupled to winding 1741 and winding 1743 of transformer 1702, respectively. Blocking capacitors $C_{B1}$ and $C_{B2}$ as well as resonant capacitor $C_R$ of second stage circuit 1720 can block any DC current through windings 1741, 1742, and 1743 and prevent saturation of transformer 1702. It is appreciated, however, that the capacitance of blocking capacitors $C_{B1}$ and $C_{B2}$ is much greater than that of resonant capacitor $C_R$, such that resonant frequency of series resonant converter between second and first stage circuits 1720 and 1710 and resonant frequency of series resonant converter between second and third stage circuits 1720 and 1730 are approximately the same as that without the blocking capacitors. This may be achieved, for example, by having the capacitance of blocking capacitors $C_{B1}$ and $C_{B2}$ in the microfarad range, while having the capacitance of resonant capacitor $C_R$, in nanofarad range.

It should be noted that the uneven duty-cycles of the switches are caused by the uneven delays of the gate drive signals and unequal turn-on and turn-off delays of the switches. If the mismatch of the delays is well minimized by an optimized design procedure, saturation of a transformer can be prevented by designing a transformer with a relatively large air gap without blocking capacitors as shown in FIG. 4.

Figure 18:
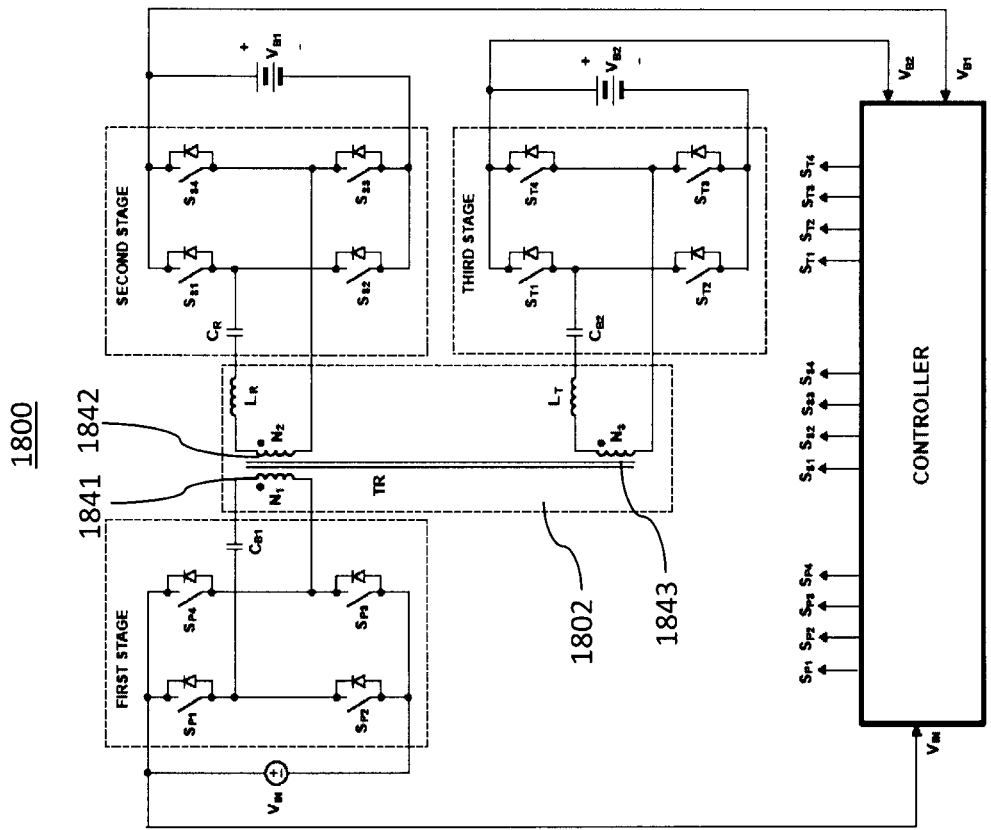
FIG. 18 illustrates a triple-port bidirectional DC-DC converter, in accordance with yet another embodiment of the present disclosure.

FIG. 18 illustrates a triple-port bidirectional DC-DC converter 1800 in accordance with yet another embodiment of the present disclosure. Converter 1800 in FIG. 18 is substantially the same as converter 1700 in FIG. 17, except that inductors $L_R$ and $L_T$ originally included respectively in second and third stage circuits 1720 and 1730 of FIG. 17 are now magnetically integrated into transformer 1802 of FIG. 18. By properly positioning windings 1841, 1842, and 1843 of transformer 1802 (e.g., by leaving a space/gap between neighboring turns of windings $N_1$, $N_2$, and $N_3$), leakage inductances of these windings can be determined and perform as series connected inductors $L_R$ and $L_T$. It should be noted that the leakage inductance of winding 1841 is minimized in comparison with the leakage inductances of windings 1842 and 1843.

Figure 19:
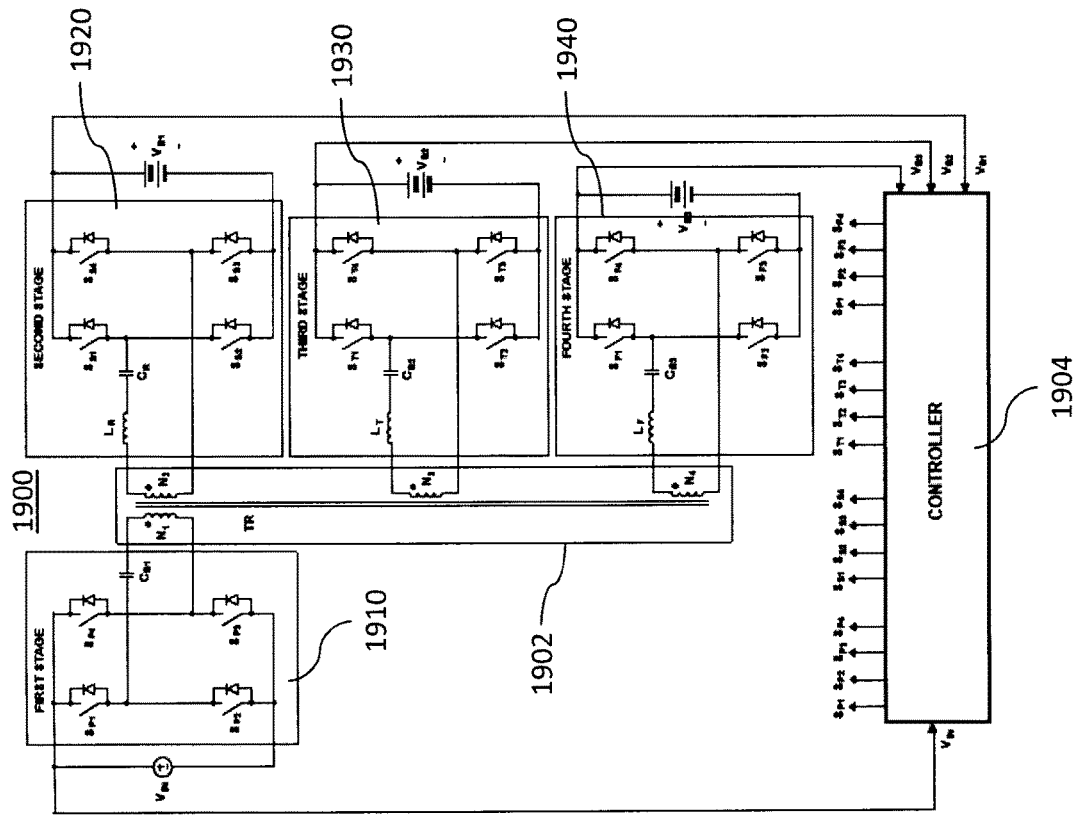
FIG. 19 illustrates a quadruple-port bidirectional DC-DC converter, in accordance with an embodiment of the present disclosure.

FIG. 19 illustrates a quadruple-port bidirectional DC-DC converter 1900, in accordance with an embodiment of the present disclosure. As shown in FIG. 19, converter includes four converter stages (i.e., a first stage 1910, a second stage 1920, a third stage 1930 and a fourth stage 1940) magnetically coupled to each other through transformer 1902 and individually controllable by controller 1904. As shown in FIG. 19, first, each of third and fourth stage circuits 1910, 1930, and 1940 can optionally include a blocking capacitor, while second stage circuit 1920 includes a resonant capacitor having a much smaller capacitance than the blocking capacitor.

Figure 20:
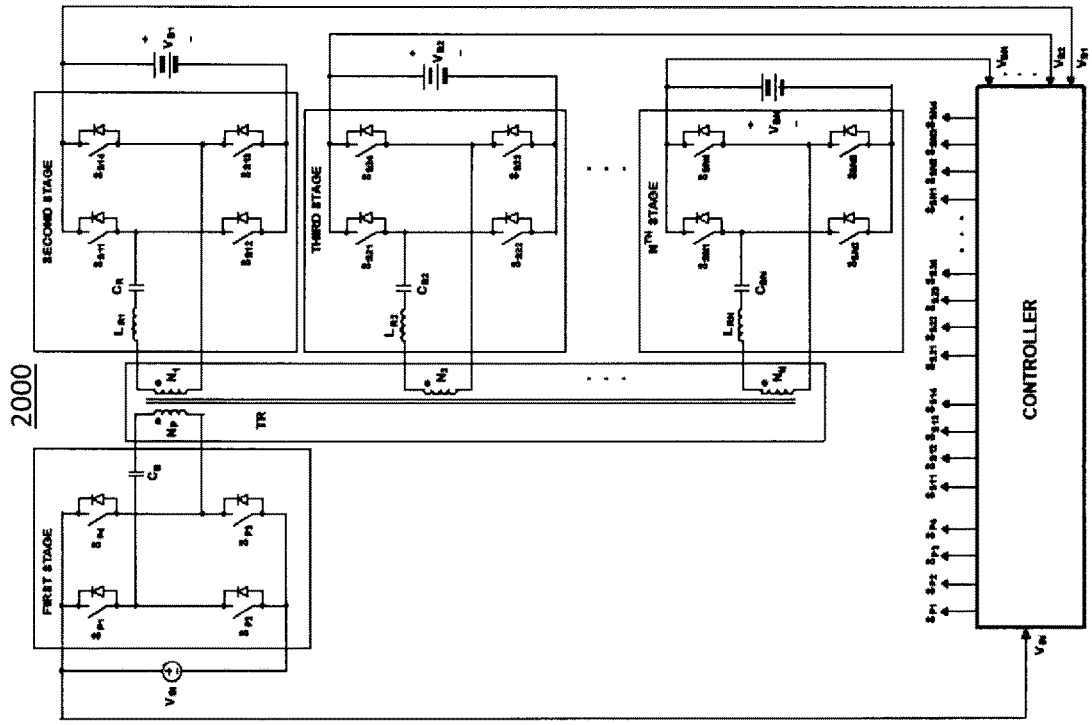
FIG. 20 illustrates a multiple-port bidirectional DC-DC converter 2000, in accordance with an embodiment of the present disclosure.

FIG. 20 illustrates a multiple-port bidirectional DC-DC converter 2000, in accordance with an embodiment of the present disclosure. As shown in FIG. 20, converter 2000 is generalized to include N-stages. Each of the stages can optionally include a blocking capacitor except the second stage which instead includes a resonant capacitor having a much smaller capacitance than the blocking capacitor. In this embodiment, only one of the stages is configured to transfer electric energy as an SRC, while the remaining stages are configured to transfer energy as a DAB. In some embodiments, phase shift control may be used for each DAB and the amount of phase shift may be determined independently for each.

Those of ordinary skill in the art will appreciate that various modifications to the converter's circuit topology can be made that are within the scope of the disclosure.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical value appearing in the present disclosure are deemed to be both the stated value, and alternatively modified by a term of degree (e.g., "about").

Although various embodiments of the present disclosure have been described in detail herein, one of ordinary skill in the art would readily appreciate modifications and other embodiments without departing from the spirit and scope of the present disclosure as stated in the appended claims.

What is claimed is:

1. A multiple-port converter, comprising:
   a transformer having a primary winding, a secondary winding and a tertiary winding;
   a primary power stage having a first plurality of switches and electrically connected to a first energy source and the primary winding of the transformer;
   a secondary power stage having a second plurality of switches and at least a resonant capacitor and a resonant inductor connected in series, and electrically connected to a second energy source and the secondary winding of the transformer, the primary power stage and secondary power stage forming a series resonant converter with an associated resonance frequency determined by the resonant capacitor and the resonant inductor;
   a tertiary power stage having a third plurality of switches and at least an inductor and electrically connected to a third energy source and the tertiary winding of the transformer, the primary power stage and tertiary power stage forming a dual active bridge converter with an associated inductance between the primary power stage and the tertiary power stage; and
   a controller electrically connected to the primary, secondary, and tertiary power stages to measure operating conditions in the multiple-port converter and to provide control signals to the first, second and third plurality of switches;
   wherein the controller comprises control logic configured to send the control signals to the first, second, and third plurality of switches, the control logic of the controller is configured to vary a switching frequency of the first plurality of switches or the second plurality of switches to regulate current corresponding to the second energy source,
   wherein the secondary power stage and the tertiary power stage are controlled independently from each other.

2. The multiple-port converter of claim 1, wherein the controller comprises control logic configured to send the control signals to the first and second plurality of switches to transfer energy between the first energy source and the second energy source using phase delay control.

3. The multiple-port converter of claim 1, wherein the controller comprises control logic configured to send the control signals to the first and second plurality of switches to transfer energy between the first energy source and the second energy source using both phase delay control and delay time control.

4. The multiple-port converter of claim 1, wherein the controller comprises control logic configured to send the control signals to the first, second, and third plurality of switches to transfer energy from the first energy source to the second energy source using phase delay control and to transfer energy from the first energy source to the third energy source using phase shift control.

5. The multiple-port converter of claim 4, wherein the control logic of the controller is configured to vary the switching frequency of the control signals to modulate an amount of energy transferred to the secondary stage, and wherein the phase shift control modulates an amount of energy transferred to the tertiary stage.

6. The multiple-port converter of claim 5, wherein the switching frequency is the same for the primary, secondary, and tertiary stages.

7. The multiple-port converter of claim 1, wherein
   the controller has control logic configured to send first and second control signals to the first plurality of switches and to send third and fourth control signals to the second plurality of switches,
   the third control signals are identical to the first control signal with a phase delay, and
   the fourth control signals are identical to the second control signal with the phase delay.

8. The multiple-port converter of claim 1, wherein the resonant capacitor and the resonant inductor of the secondary power stage are in series with the secondary winding of the transformer.

9. The multiple-port converter of claim 8, wherein the inductor of the tertiary power stage is in series with the tertiary winding of the transformer.

10. The multiple-port converter of claim 9, wherein the primary stage has a capacitor in series with the primary winding of the transformer, the tertiary stage has a capacitor in series with the tertiary winding of the transformer.

11. The multiple-port converter of claim 1, wherein the controller comprises control logic configured to send the control signals to the first, second, and third plurality of switches to transfer energy from the second energy source to the first energy source using phase delay control and delay time control, and from the first energy source to the third energy source using phase shift control.

12. The multiple-port converter of claim 1, wherein the tertiary power stage is a first tertiary power stage among a plurality of tertiary power stages, each of the plurality of tertiary power stages connected to a respective winding of the transformer and to a respective energy source, each tertiary power stage forming a respective dual active bridge converter with the primary power stage.

13. A method of controlling a DC-DC converter having a plurality of stages including first, second and third stages, the method comprising acts of:
   measuring a plurality of electrical properties of the DC-DC converter;
   determining a switching frequency, phase delay, and phase shift based at least in part on the measured plurality of electrical properties;
   switching a first plurality of switches of the first stage at the switching frequency;
   switching at least two of a second plurality of switches of the second stage at the switching frequency, time shifted by the phase delay relative to switching of at least one of the first plurality of switches;

switching at least two of a third plurality of switches of the third stage at the switching frequency, time shifted by the phase shift relative to switching of at least one of the first plurality of switches; and varying the switching frequency of the first plurality of switches or the second plurality of switches to regulate current corresponding to the second power stage, wherein the second power stage and the third power stage are controlled independently from each other.

14. The method of claim 13, further comprising acts of:
determining a delay time based at least in part on the measured plurality of electrical properties; and
switching at least two other of the second plurality of switches of the second stage at the switching frequency, time shifted by the delay time relative to switching of the at least two second switches.

15. The method of claim 13, wherein the measuring comprises measuring at least one of a group consisting of a voltage of an energy source connected to one of the plurality of stages and a current in one of the plurality of stages.

16. The method of claim 13, further comprising an act of:
electrically coupling the plurality of stages through a transformer having a first winding wired to the first stage, a second winding wired to the second stage, and a third winding wired to the third stage.

17. The method of claim 16, wherein a resonance frequency of the second stage is determined by a second stage inductor and a second stage capacitor which are in series with the second winding of the transformer.

18. The method of claim 16, wherein the third stage has a third stage inductor in series with the third winding of the transformer.

19. A multiple-port converter, comprising:
a transformer having a first winding, a second winding, and a third winding;
a series resonant converter formed by a first power stage and a second power stage;
a dual active bridge converter formed by the first power stage and a third power stage, wherein the first power stage is wired to the first winding, the second power stage is wired to the second winding, and the third power stage is wired to the third winding; and
a controller to measure operating conditions of the multiple-port converter and to provide control signals to the first, second and third power stages, wherein the controller is configured to vary a switching frequency of switches of the first power stage or the third power stage to regulate current corresponding to the third power stage,
wherein the second power stage and the third power stage are controlled independently from each other.

20. The multiple-port converter of claim 19, wherein the controller is further configured to vary a switching frequency of control signals sent to the first and second power stage, thereby modulating an amount of energy transferred to the secondary power stage.

* * * * *